(12) United States Patent
Waisbein et al.

(10) Patent No.: US 8,997,008 B2
(45) Date of Patent: Mar. 31, 2015

(54) SYSTEM AND METHOD FOR SEARCHING THROUGH A GRAPHIC USER INTERFACE

(75) Inventors: Leon Waisbein, Ramat Hasharon (IL); Yaron Finkel, Yahud (IL)

(73) Assignee: Pelicans Networks Ltd., Ramat Gan (IL)

(*) Notice: Subject to any disclaimer, the term of this patent is extended or adjusted under 35 U.S.C. 154(b) by 123 days.

(21) Appl. No.: 13/550,716

(22) Filed: Jul. 17, 2012

(65) Prior Publication Data

US 2014/0026083 A1    Jan. 23, 2014

(51) Int. Cl.
*G06F 3/048* (2013.01)
*G06F 17/30* (2006.01)

(52) U.S. Cl.
CPC .... G06F 17/30973 (2013.01); G06F 17/30864 (2013.01)
USPC ............................ 715/763; 715/833; 707/749

(58) Field of Classification Search
CPC .......... G06F 3/04847; G06F 17/30061; G06F 17/30955; G06F 17/30973; G06F 17/30994
USPC .......... 715/763, 833, 834, 968, 974; 707/749
See application file for complete search history.

(56) References Cited

U.S. PATENT DOCUMENTS

| | | | |
|---|---|---|---|
| 5,201,047 A | 4/1993 | Maki et al. | |
| 5,659,731 A | 8/1997 | Gustafson | |
| 5,983,220 A * | 11/1999 | Schmitt .............................. | 1/1 |
| 6,012,053 A | 1/2000 | Pant et al. | |
| 6,463,431 B1 | 10/2002 | Schmitt | |
| 6,647,383 B1 | 11/2003 | August et al. | |
| 6,693,651 B2 | 2/2004 | Biebesheimer et al. | |
| 6,859,455 B1 | 2/2005 | Yazdani et al. | |
| 7,383,258 B2 | 6/2008 | Harik et al. | |
| 7,432,927 B2 * | 10/2008 | Iguchi et al. .................. | 345/440 |

(Continued)

FOREIGN PATENT DOCUMENTS

| | | |
|---|---|---|
| EP | 1259880 A2 | 11/2002 |
| WO | 2001037120 A3 | 5/2004 |

(Continued)

OTHER PUBLICATIONS

"Shape," Merriam-Webster Dictionary, Nov. 14, 2014, available at <http://www.merriam-webster.com/dictionary/shape>.*

(Continued)

*Primary Examiner* — Doon Chow
*Assistant Examiner* — Andrew T Chiusano
(74) *Attorney, Agent, or Firm* — The Law Office of Michael E. Kondoudis

(57) ABSTRACT

A computer-implemented method for constructing and manipulating a Graphic User Interface (GUI), comprising retrieving from a data repository first GUI data representing at least (i) an entity, (ii) attributes of an entity, (iii) a manipulatable scale associated with a respective attribute; constructing on a screen the GUI including converting the first GUI data into displayable GUI data which include at least the entity, its attributes and for at least one of the attributes a manipulatable scale and displaying the displayable GUI data; enabling a user to perform on the GUI a manipulation of at least one manipulatable scale of a respective attribute giving rise to manipulated displayable GUI data; converting the manipulated displayable GUI data into second GUI data representing at least one data record; and using the at least one data record or portion thereof for operations in the data repository.

2 Claims, 21 Drawing Sheets

(56) References Cited

U.S. PATENT DOCUMENTS

| | | | |
|---|---|---|---|
| 7,451,470 B2* | 11/2008 | Zimmerman | 725/46 |
| 7,603,367 B1* | 10/2009 | Kanter et al. | 1/1 |
| 7,788,274 B1 | 8/2010 | Ionescu | |
| 7,801,896 B2 | 9/2010 | Szabo | |
| 7,814,115 B2 | 10/2010 | White et al. | |
| 7,836,046 B2* | 11/2010 | Sarkar et al. | 707/723 |
| 8,001,152 B1 | 8/2011 | Solan | |
| 8,639,682 B2* | 1/2014 | Cumby et al. | 707/708 |
| 2002/0105550 A1 | 8/2002 | Biebesheimer et al. | |
| 2003/0046401 A1 | 3/2003 | Abbott et al. | |
| 2004/0030741 A1 | 2/2004 | Wolton et al. | |
| 2004/0210491 A1* | 10/2004 | Sadri | 705/26 |
| 2005/0015376 A1 | 1/2005 | Fraser et al. | |
| 2006/0149606 A1 | 7/2006 | Goan, Jr. et al. | |
| 2007/0083505 A1 | 4/2007 | Ferrari et al. | |
| 2007/0168331 A1 | 7/2007 | Reddy et al. | |
| 2008/0091655 A1 | 4/2008 | Gokhale et al. | |
| 2008/0190272 A1 | 8/2008 | Taub et al. | |
| 2009/0033664 A1* | 2/2009 | Hao et al. | 345/440 |
| 2009/0094053 A1* | 4/2009 | Jung et al. | 705/2 |
| 2009/0164317 A1 | 6/2009 | Glazer | |
| 2009/0293019 A1* | 11/2009 | Raffel et al. | 715/833 |
| 2010/0161541 A1 | 6/2010 | Covannon et al. | |
| 2010/0299348 A1 | 11/2010 | Gill et al. | |
| 2010/0325583 A1* | 12/2010 | Aarni et al. | 715/833 |
| 2010/0333028 A1* | 12/2010 | Welsh et al. | 715/833 |
| 2011/0022600 A1 | 1/2011 | Sathe et al. | |
| 2011/0137730 A1 | 6/2011 | McCarney et al. | |
| 2011/0161054 A1 | 6/2011 | Woolf et al. | |
| 2011/0252031 A1* | 10/2011 | Blumenthal et al. | 707/733 |
| 2011/0264498 A1 | 10/2011 | Grant et al. | |
| 2011/0307465 A1 | 12/2011 | Ghosh et al. | |
| 2012/0278342 A1* | 11/2012 | Purdy | 707/749 |
| 2012/0323725 A1* | 12/2012 | Johnston et al. | 705/26.7 |
| 2013/0239057 A1* | 9/2013 | Ubillos et al. | 715/833 |
| 2014/0025668 A1* | 1/2014 | Lin et al. | 707/723 |

FOREIGN PATENT DOCUMENTS

| | | |
|---|---|---|
| WO | 2005022402 A1 | 3/2005 |
| WO | 2006058558 A1 | 6/2006 |
| WO | 2010018451 A4 | 4/2010 |
| WO | 2010050844 A1 | 5/2010 |
| WO | 2011076986 A1 | 6/2011 |
| WO | 2011159989 A1 | 12/2011 |

OTHER PUBLICATIONS

Bazzanella, et al., "Searching for Individual Entities: a Query Analysis." Information Reuse and Integration (IRI), 2010 IEEE International Conference, IEEE, Aug. 4-6, 2010, pp. 115-120, Trento, Italy.

Kalashnikov et al., "Disambiguation Algorithm for People Search on the Web." Data Engineering, 2007. ICDE 2007. IEEE 23rd International Conference, IEEE, Apr. 2007, University of California, Irvine, CA.

Su et al., "A Framework of Service Oriented Semantic Search Engine." Computational Problem-Solving (ICCP), 2011 International Conference, IEEE, 2011, pp. 499-504, University of Electronic Science and Technology of China, Sichuan, China.

Demartini et al. "A Model for Ranking Entities and Its Application to Wikipedia." Latin American Web Conference, 2008. LA-WEB'08.. IEEE, 2008, Leibniz University Hannover, Germany.

Liu et al., "An Object-oriented Approach on Web Information Representation and Derivation." e-Technology, e-Commerce and e-Service, 2004. EEE '04, 2004 IEEE International Conference, IEEE, 2004, Australia.

Leach et al., "Query Routing: Applying Systems Thinking to Internet Search." Operating Systems, 1997., The Sixth Workshop on Hot Topics, IEEE, 1997, pp. 82-86, Redmond, WA.

Cheng, et al., "Toward Large Scale Data-Ware Search: Ranking, Indexing, Resolution and Beyond." Data Engineering Workshops (ICDEW), 2010 IEEE 26th International Conference, IEEE, 2010, pp. 297-300, University of Illinois of Urbana-Champaign, Urbana, IL.

Bradford, Roger B. "Entity Refinement Using Latent Semantic Indexing." Intelligence and Security Informatics (ISI), 2010 IEEE International Conference, IEEE, Apr. 2010, pp. 126-128, Chantilly, VA.

Zhang et al., "EagleEye: Entity-centric business intelligence for smarter decisions." IBM Journal of Research and Development vol. 54 No. 6, Paper 1, Nov./Dec. 2010.

Zelitcheko, Alexander. "About Vi-Fi (Visible-Findable)—how to describe and to search sites with standard and universal semantic-pragmatic tree: semantic web as pragmatic web." Proceedings of the 3rd International Conference on the Pragmatic Web: Innovating the Interactive Society. ACM, 2008, Cyprus.

* cited by examiner

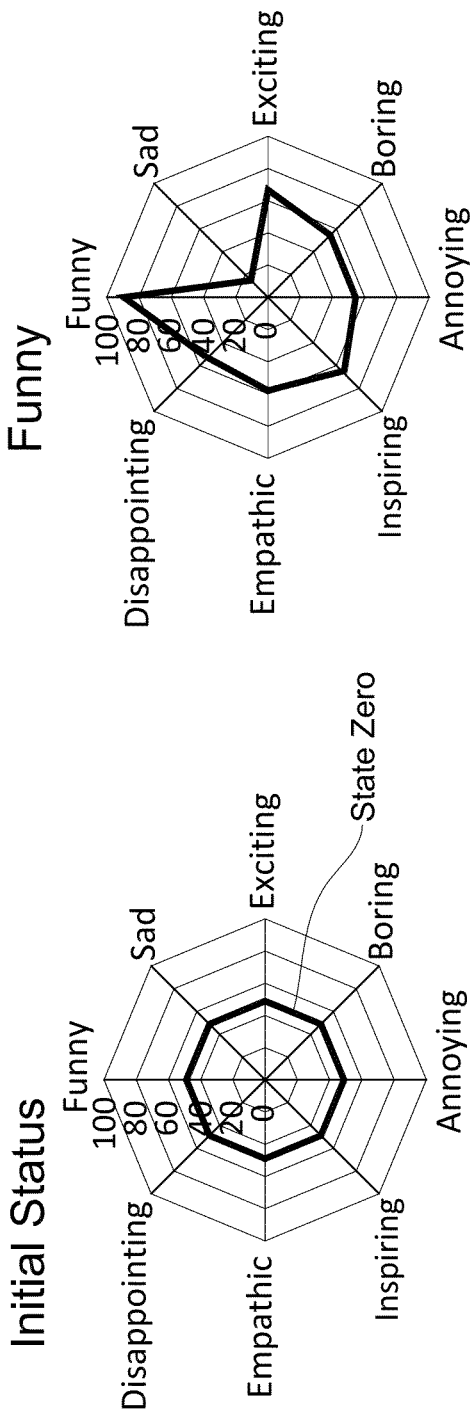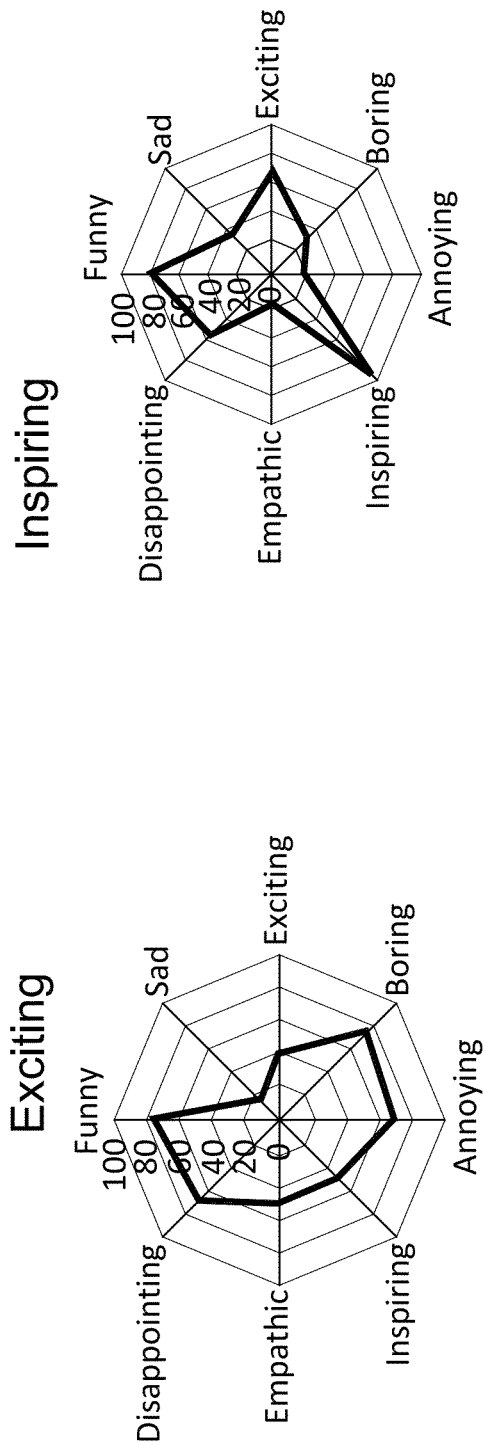

Fig. 2I

|  | Funny | Sad | Exciting | Boring | Annoying | Inspiring | Empathic | Disappointing |
|---|---|---|---|---|---|---|---|---|
| Funny |  |  |  |  |  |  |  |  |
| Sad | -0.9 |  |  |  |  |  |  |  |
| Exciting | 0.5 | -0.1 |  |  |  |  |  |  |
| Boring | 0.2 | 0.1 | -0.1 |  |  |  |  |  |
| Annoying | 0.1 | 0.5 | -0.6 | -0.7 |  |  |  |  |
| Inspiring | 0.4 | 0.7 | 0.6 | -0.8 | -0.9 |  |  |  |
| Empathic | 0.2 | 0.8 | 0.2 | -0.6 | -0.8 | -0.6 |  |  |
| Disappointing | 0.1 | 0.6 | -0.7 | 0.7 | 0.6 | -0.2 | -0.4 |  |

Fig. 2J

|  | Initial | Funny+ 40 | Tradeoff A | Exciting -30 | Tradeoff B | Inspiring+ 49.6 | Tradeoff C |
|---|---|---|---|---|---|---|---|
| Funny | 50 | 90 | 90 | 77 | 77 | 96.84 | 82.76 |
| Sad | 50 | 14 | 14 | 16.6 | 16.6 | 51.32 | 37.24 |
| Exciting | 50 | 70 | 66 | 40 | 40 | 69.76 | 69.76 |
| Boring | 50 | 58 | 54 | 74.8 | 74.8 | 35.12 | 35.12 |
| Annoying | 50 | 54 | 54 | 69.6 | 69.6 | 24.96 | 22.48 |
| Inspiring | 50 | 66 | 66 | 50.4 | 50.4 | 100 | 97.52 |
| Empathic | 50 | 58 | 58 | 52.8 | 50.3 | 20.54 | 20.54 |
| Disappointing | 50 | 54 | 54 | 72.2 | 69.7 | 59.78 | 59.78 |

| Round Name | Round Origin (Father) | Round Weight |
|---|---|---|
| Outdoor Entertainment | Entertainment | 100 |

Fig. 5A

| Round Name | Round Origin (Father) | Round Group | Group Weight | Group Operation | Cause | Group Type | Scale | Scale To | Pick Limit | Manipulation mode | Tradeoff Sum Min | Tradeoff Sum Max |
|---|---|---|---|---|---|---|---|---|---|---|---|---|
| Feature Movie | Outdoor Entertainment | Genre | 10 | OR | Search | Slide | 0 | 100 | | Partial Tradeoff | 50 | 200 |

Fig. 5B

| Round Name | Round Origin (Father) | Round Group | Attribute Name | Attribute Weight |
|---|---|---|---|---|
| Feature Movie | Outdoor Entertainment | Genre | Thriller | 1 |

Fig. 5C

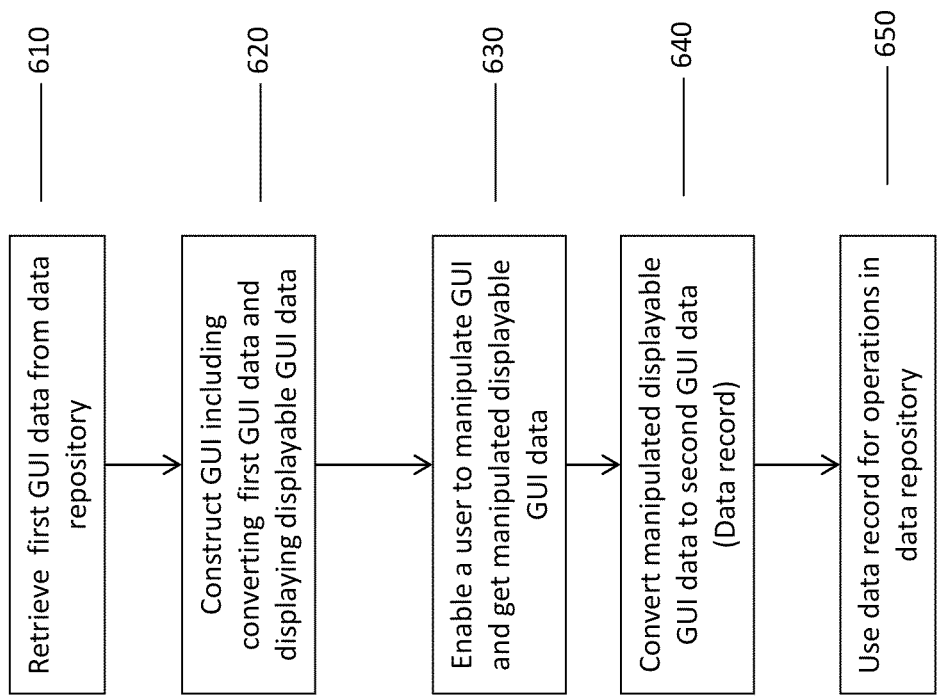

| Rd. Name | Rd. Origin | Rd. Group | Att. Name | Att. Weight | Att. Scale 1 | Att. Scale 2 | Att.Comp. Score | Group Score | W. Group Score | S.Match Score | W.S.Match Score 1 | W.S.Match Score 2 |
|---|---|---|---|---|---|---|---|---|---|---|---|---|
| Ent. | - | Type | Indoor Ent. | 1 | 20 | 0 | 0 | 80% | 27% | 93% | | 95% |
| Ent. | - | Type | Outdoor Ent. | 1 | 80 | 100 | 80 | | | | | |
| Ent. | - | Companion | Single | 1 | 0 | 1 | 0 | 100% | 66% | | | |
| Ent. | - | Companion | Couple | 1 | 0 | 1 | 0 | | | | | |
| Ent. | - | Companion | Friends | 1 | 0 | 0 | 0 | | | | | |
| Ent. | - | Companion | Family | 1 | 1 | 1 | 1 | | | | | |
| Indoor Ent. | Ent. | Read | Book | 1 | | | | | | | | |
| Indoor Ent. | Ent. | Read | Magazine | 1 | | | | | | | | |
| Indoor Ent. | Ent. | Read | Onine | 1 | | | | | | | | |
| Indoor Ent. | Ent. | Watch | TV | 1 | | | | | | | | |
| Indoor Ent. | Ent. | Watch | Feature Movie | 1 | | | | | | | | |
| Indoor Ent. | Ent. | Watch | VOD | 1 | | | | | | | | |
| Indoor Ent. | Ent. | Watch | Downloaded | 1 | | | | | | | | |
| Indoor Ent. | Ent. | Play | Box game | 1 | | | | | | | | |
| Indoor Ent. | Ent. | Play | Online game | 1 | | | | | | | | |
| Indoor Ent. | Ent. | Play | Cards game | 1 | | | | | | | | |
| | | | | | | | | | | Feature Movie level match | Outdoor Ent. level match | Ent. level match |

Fig. 13A

| Rd. Name | Rd. Origin | Rd. Group | Att. Name | Att. Weight | Att. Scale 1 | Att. Scale 2 | Att. Comp. Score | Group Score | W. Group Score | S.Match Score | W.S. Match Score 1 | W.S. Match Score 2 |
|---|---|---|---|---|---|---|---|---|---|---|---|---|
| Outdoor Ent. | Ent. | Type | Feature Movie | 1 | 100 | 100 | 100 | 100% | | 100% | 96% | |
| Outdoor Ent. | Ent. | Type | Restaurant | 1 | 50 | 0 | 0 | | | | | |
| Outdoor Ent. | Ent. | Type | Show | 1 | 0 | 0 | 0 | | | | | |
| Outdoor Ent. | Ent. | Type | Theater | 1 | 0 | 0 | 0 | | | | | |
| Outdoor Ent. | Ent. | Type | Bar | 1 | 0 | 0 | 0 | | | | | |
| Feature Movie | Out. Ent. | Genre | Thriller | 1 | 50 | 0 | 0 | 90% | 20% | 92% | | |
| Feature Movie | Out. Ent. | Genre | Animation | 1 | 0 | 0 | 0 | | | | | |
| Feature Movie | Out. Ent. | Genre | Romantic | 1 | 90 | 100 | 90 | | | | | |
| Feature Movie | Out. Ent. | Genre | Fiction | 1 | 0 | 0 | 0 | | | | | |
| Feature Movie | Out. Ent. | Genre | Drama | 1 | 90 | 100 | 90 | | | | | |
| Feature Movie | Out. Ent. | Genre | Comedy | 1 | 90 | 0 | 0 | | | | | |
| Feature Movie | Out. Ent. | Genre | Musical | 1 | 0 | 0 | 0 | | | | | |
| Feature Movie | Out. Ent. | Location | City 1 | 1 | 1 | 0 | 0 | 100% | 44% | | | |
| Feature Movie | Out. Ent. | Location | City 2 | 1 | | 0 | 0 | | | | | |
| Feature Movie | Out. Ent. | Location | City 3 | 1 | 1 | 1 | 1 | | | | | |
| Feature Movie | Out. Ent. | Location | City 4 | 1 | 1 | 0 | 0 | | | | | |
| Feature Movie | Out. Ent. | Raiting | Raiting | 1 | 90 | 75 | 75 | 83% | 28% | | Feature Movie level match | Outdoor Ent. level match | Ent. level match |

| Quiz Name | Quiz Origin (Father) | Quiz Weight |
|---|---|---|
| Entertainment | - | 100 |
| Outdoor Entertainment | Entertainment | 110 |
| Indoor Entertainment | Entertainment | 110 |
| Feature Movie | Indoor Entertainment | 120 |
| Feature Movie | Outdoor Entertainment | 120 |

Fig. 13C

| Round Name | Round Origin (Father) | Round Group | Group Weight | Group Operation | Cause | Group Type | Scale From | Scale To | Pick Limit | Manipulation mode | Tradeoff Sum Min | Tradeoff Sum Max |
|---|---|---|---|---|---|---|---|---|---|---|---|---|
| Entertainment | - | Type | 10 | OR | | Slide | 0 | 100 | | Full Tradeoff | | |
| Entertainment | - | Companion | 20 | OR | Search | Pick | | | 1 | Pick | | |
| Entertainment | - | Companion | 20 | AND | Index | Pick | | | #max | Pick | | |
| Indoor Entertainment | Entertainment | Read | 10 | OR | | Slide | 0 | 100 | | Full Tradeoff | | |
| Indoor Entertainment | Entertainment | Watch | 10 | OR | | Slide | 0 | 100 | | Full Tradeoff | | |
| Indoor Entertainment | Entertainment | Play | 10 | OR | | Slide | 0 | 100 | | Full Tradeoff | | |
| Outdoor Entertainment | Entertainment | Type | 10 | OR | | Slide | 0 | 100 | | Partial Tradeoff | 100 | |
| Feature Movie | Indoor Entertainment | n/a | | | | | | | | | | |
| Feature Movie | Outdoor Entertainment | Genre | 10 | OR | Index | | | | #no-limit | Partial Tradeoff | 50 | |
| Feature Movie | Outdoor Entertainment | Location | 20 | AND | | | | | | | | #max |
| Feature Movie | Outdoor Entertainment | Location | 20 | OR | Search | Slide | | | 1 | | | |
| Feature Movie | Outdoor Entertainment | Rating | 15 | OR | | Slide | | | | Full Tradeoff | | |

SYSTEM AND METHOD FOR SEARCHING THROUGH A GRAPHIC USER INTERFACE

FIELD OF THE PRESENTLY DISCLOSED SUBJECT MATTER

This invention relates to the field of web searching, and more specifically to the field of searching through a Graphic User Interface.

BACKGROUND

Web searching has become one of the most common and important activities on the Internet. Most of the time users enter their search queries (typically by using keywords such as a phrase or a combination of terms) into a search engine to look for the information they need. The search engine then examines the search query and provides a listing of best-matching web pages according to a given criterion or criteria. Traditional Information Retrieval (IR) technology used by search engines is typically based on the occurrence of words in documents. Some search engines provide certain advanced features such as the proximity search which allows users to define the distance between keywords. There is also concept-based searching where the research involves using statistical analysis on pages containing the words or phrases the user searches for. In addition, a semantic search attempts to augment and improve traditional search results (based on IR technology) by understanding user's intent and the contextual meaning of search terms, and using data from the semantic web, which defines and links the data on the web facilitating more efficient discovery and integration. Major web search engines like GOOGLE® and BING® have incorporated some Semantic Search elements.

However, a semantic search has only been applied to a very limited extent, not only because of the difficulty of creating a semantic web, but also due to difficulty in extracting and understanding a user's intent from the text of a search query, which involves natural language processing and a semantic dictionary etc.

Most currently used search engines and search portals (whether semantic search engines or not) present users with a Graphic User Interface (GUI) with a search box which allows users to enter free form queries. The advantage of a search box is, for instance, that it is very easy and handy to use, however the disadvantage is that users are limited to specify their requests using words, phrases or simple sentences. According to Wikipedia, most users usually enter primitive search queries with an average length of 2.4 terms. Less than 5% of users would use advanced search features. Thus it may be difficult to find the relevant information based on a brief and implicit query.

Both searchers and content providers need a common and innovative form (such as a GUI) to enable searching with sufficient and specific details, thus increasing the chance of better matching results.

There is thus a need in the art for a new method and system for searching through a GUI.

References considered to be relevant as background to the presently disclosed subject matter are listed below. Acknowledgement of the references herein is not to be inferred as meaning that these are in any way relevant to the patentability of the presently disclosed subject matter.

U.S. Pat. No. 8,001,152 (Solan) issued on Aug. 16, 2011 discloses a search interface and searching technology for interactive search refinement based on feature similarity (IS-RFS), which provides an interactive search tool based on human associative and semantic knowledge. Given a query, the tool may retrieve the most suitable textual items in a repository of textual data that is categorized or/and partially tagged. In the user interface, an equalizer controller may be used to refine the search results, for example, based on manually or automatically extracted features and a graded semantic scale to adjust the weights of the various features. The technology may be applied to any data repository.

WO 2011/159989 (Ghosh et al.) published on Dec. 22, 2011 discloses a new approach that contemplates systems and methods to generate customized subjective search results from the perspective of a user who conducts the search or any other subject entity chosen by the user. A scored subject list is created from the user's network of sources/subjects/contacts, where each element on the list is a subject/source and the score reflects the subject's potential influence or closeness of its connection/relation with the user. Once created, the subject list is then used as a bias filter on the list of citations from search results. With such influence-weighted citation scores, objects and/or subjects from citations of subjects that have a big influence on or enjoy high respect from the user, will be ranked prominently in the search result presented to the user, thus biasing the search results from the user's perspective.

US 2011307465 (Ghosh et al.) published on Dec. 15, 2011 discloses a new approach that contemplates systems and methods to ascribe or transfer metadata from one search-related entity to another, where each entity can be one of subject or source, citation, and object or target. First, one or more complete or incomplete attributes associated with one or more of entities across source, citation and target are identified with a high degree of probable accuracy, wherein such metadata or attributes include but are not limited to, time, language, and location of the entities. The identified attributes are then ascribed or transferred from one entity where the metadata is available to other search entities. Finally, the transferred attributes can be utilized to facilitate the selection and ranking of the cited targets for the search result.

WO 2005022402 (Gosse et al.) published on Mar. 10, 2005 discloses a method, device, and software for presenting search results obtained from a plurality of databases, based on an end-user specified query. In an embodiment, the search results are combined from results from a first index and results from a second index. The first index comprises a plurality of index entries modifiable by an administrator, and the second index comprises a plurality of index entries that are not modifiable by the administrator. In the combined search results, any search result from the second index for which an associated key field is identical to the associated key field of a matching search result in the first set of search results is discarded in favor of the matching search result in the first set of search results.

"Vi-Fi (Visible-Findable)—how to describe and to search sites with standard and universal semantic-pragmatic tree: Semantic Web as Pragmatic Web" (Alexander Zelitchenko) discloses a new approach to web search, which provides a powerful narrow-focused marketing tool for small on-line businesses as well as for anyone who wishes to increase visibility in the Web. The core of approach is an observable (small enough—of the order of tens) standard universal system of both attributes and their values, which describes requests of WEB-users and content (offers) of sites in the same language and allow to calculate easily congruency between query and site. This system is based on pragmatics (logic of customer's request) rather than on usual ("pure") ontology and is organized as tree. Both web-masters and searchers browse this tree to describe their sites and queries respectively. The tree changes until taking its ultimate form, as approach is realized.

SUMMARY

In accordance with an aspect of the presently disclosed subject matter, there is provided a computer implemented method for constructing and manipulating a Graphic User Interface (GUI), comprising:

a) retrieving from a data repository first GUI data representing at least (i) an entity, (ii) attributes of an entity, (iii) a manipulatable scale associated with a respective attribute and signifying a level of significance of the attribute;

b) constructing on a screen the GUI including converting the first GUI data into displayable GUI data which include at least the entity, its attributes and for at least one of the attributes a manipulatable scale and displaying the displayable GUI data;

c) enabling a user to perform on the GUI a manipulation of at least one manipulatable scale of a respective attribute giving rise to manipulated displayable GUI data;

d) converting the manipulated displayable GUI data into second GUI data representing at least one data record that includes attribute data corresponding to the attributes and scale data corresponding to scales associated with respective attributes; and e) using the at least one data record or portion thereof for operations in the data repository.

In accordance with an embodiment of the presently disclosed subject matter, there is further provided a method, wherein at least one of the operations in the data repository is selected from a group comprising storing the at least one data record or portion thereof in the data repository; and searching the data repository for data matching the at least one data record or portion thereof.

In accordance with an embodiment of the presently disclosed subject matter, there is yet further provided a method, wherein the retrieving includes retrieving from a data repository first GUI data representing at least one data record that includes at least attribute data and scale data, each data record representing an entity, the attribute data associated with the entity representing attributes of the entity, each scale data representing a scale associated with a respective attribute and signifying a level of significance of the attribute;

and wherein the converting includes converting at least the manipulated scales of the manipulated displayable GUI data into second GUI data representing a portion of a data record that includes scale data corresponding to the manipulated scales, wherein the data record includes attribute data corresponding to the attributes and scale data corresponding to scales associated with respective attributes;

and wherein the using includes using at least the portion of the data record for operations in the data repository.

In accordance with an embodiment of the presently disclosed subject matter, there is yet further provided a method, wherein the retrieving includes retrieving from a data repository first GUI data representing at least one set of templates that include at least attribute data and manipulatable scale data, each set of templates representing an entity, the attribute data associated with the entity representing attributes of the entity, each manipulatable scale data representing a manipulatable scale associated with a respective attribute and signifying a level of significance of the attribute.

In accordance with an embodiment of the presently disclosed subject matter, there is yet further provided a method, wherein the constructing includes displaying the displayable GUI data including depicting the entity as a predefined shape and the attributes on the predefined shape and the manipulatable scales as sliders extending substantially from the center of the shape towards the periphery of the shape wherein the sliders comprise respective indicators indicative of the manipulatable scales that correspond to the significance of the respective attributes of the entity; and wherein the enabling further comprises enabling a user to perform on the GUI a manipulation of at least one manipulatable scale of respective attribute by moving the indicators along the sliders, giving rise to manipulated displayable GUI data.

In accordance with an embodiment of the presently disclosed subject matter, there is yet further provided a method, wherein at least one of the attributes of the entity is a rating attribute for users to express their satisfaction and feedback with regard to the entity, the method further comprising calculating overall rating of the entity by aggregating scales of the rating attributes of at least one user.

In accordance with an embodiment of the presently disclosed subject matter, there is yet further provided a method, wherein the attributes of the entity are expression and emotion attributes for users to express their opinions and feelings in regard to the entity.

In accordance with an embodiment of the presently disclosed subject matter, there is yet further provided a method wherein the entity can be one of the following: merchandise, business, person, service, media, hobby, activity, place, topic or website.

In accordance with an embodiment of the presently disclosed subject matter, there is yet further provided a method wherein the value of the scales is numeric or Boolean.

In accordance with an embodiment of the presently disclosed subject matter, there is yet further provided a method wherein the manipulation triggers an automatic manipulation of at least one other scale.

In accordance with an embodiment of the presently disclosed subject matter, there is yet further provided a method wherein clicking on at least one of the attributes on the predefined shape affects at least one other scale of another attribute according to an adjustment logic.

In accordance with an embodiment of the presently disclosed subject matter, there is yet further provided a method wherein the attributes are classified into a plurality of groups and wherein the automatic manipulation affects scales associated with attributes within the group to which the attribute associated with the manipulated scale belongs.

In accordance with an embodiment of the presently disclosed subject matter, there is yet further provided a method wherein the attributes are classified into a plurality of groups and wherein the automatic manipulation affects at least one scale associated with an attribute not within the group to which the attribute associated with the manipulated scales belongs.

In accordance with an embodiment of the presently disclosed subject matter, there is yet further provided a method, wherein the groups are assigned different weights based on a user's preferences.

In accordance with an embodiment of the presently disclosed subject matter, there is yet further provided a method wherein the attributes are assigned different weights based on a user's preferences.

In accordance with an embodiment of the presently disclosed subject matter, there is yet further provided a method wherein the automatic manipulation is defined by a manipulation mode and the first GUI data further represent group behavior which includes the manipulation mode.

In accordance with an embodiment of the presently disclosed subject matter, there is yet further provided a method wherein the manipulation mode is a full trade-off mode wherein the sum of the scales within at least one of the groups is fixed and remains fixed while at least one scale of an attribute within the group is being adjusted.

In accordance with an embodiment of the presently disclosed subject matter, there is yet further provided a method wherein the sum of the scales within at least one of the groups is fixed and the value of the sum is set by following equation: sum=(maximum value of the scales+minimum value of the scales)/2*the number of attributes within the group.

In accordance with an embodiment of the presently disclosed subject matter, there is yet further provided a method wherein the manipulation mode is partial trade-off mode wherein the sum of the scales within at least one of the groups is between an upper threshold and a lower threshold, while at least one scale of an attribute within the group is adjusted.

In accordance with an embodiment of the presently disclosed subject matter, there is yet further provided a method wherein the manipulation mode is opposite trade-off mode wherein at least one scale of an attribute within at least one of the groups correlates positively with at least one other scale of another attribute within the same group.

In accordance with an embodiment of the presently disclosed subject matter, there is yet further provided a method wherein the attributes are hierarchical and can be drilled down to sub-attributes associated with their respective scales by displaying to the user sub-attributes of one of the attributes on a shape in response to the user's selection of the one attribute.

In accordance with an embodiment of the presently disclosed subject matter, there is yet further provided a method, wherein the drilling down can be performed repeatedly on the sub-attributes for further layers of sub-attributes displayed on respective shapes until the user's needs to define the entity are fulfilled.

In accordance with an embodiment of the presently disclosed subject matter, there is yet further provided a method wherein each shape representing a layer of sub-attributes is assigned with a weight based on a user's preferences.

In accordance with an embodiment of the presently disclosed subject matter, there is yet further provided a method wherein the value of the scales is Boolean and the manipulation mode is a pick mode wherein the scale of an attribute within a group is set to 1 when the attribute is picked, and is set to 0 when the attribute is not picked, and wherein there is an upper limit of the maximum number of picked attributes within the group.

In accordance with an aspect of the presently disclosed subject matter, there is yet further provided a computer implemented method for searching through a Graphic User Interface (GUI) an entity of interest that includes a plurality of attributes, comprising:

a) retrieving from a data repository GUI data representing at least (i) an entity, (ii) attributes of an entity, and (iii) a manipulatable scale associated with a respective attribute and signifying a level of significance of the attribute;

b) constructing on a screen the GUI including converting the GUI data into displayable GUI data which includes at least the entity, its attributes and for at least one of the attributes a manipulatable scale and displaying the displayable GUI data;

c) enabling a user to perform on the GUI a manipulation of at least one manipulatable scale of respective attribute, giving rise to a search query representing the entity of interest, its attributes and scales associated with respective attributes;

d) converting the search query into GUI data of interest representing at least one data record of interest that includes attribute data corresponding to the attributes and scale data corresponding to scales associated with respective attributes;

e) searching in the data repository for at least one candidate data record which includes at least attribute data and scale data that matches the data record of interest, including comparing similarity of the attribute data and scale data of the data record of interest with corresponding attribute data and scale data of the candidate data record, giving rise to a first comparison indication, and providing similarity indication based on at least the first comparison indication.

In accordance with an embodiment of the presently disclosed subject matter, there is yet further provided a method, wherein the retrieving includes retrieving from a data repository GUI data representing at least one data record that includes at least attribute data and scale data, each data record representing an entity, the attribute data associated with the entity representing attributes of the entity, each scale data representing a scale associated with a respective attribute and signifying a level of significance of the attribute;

and wherein converting includes converting at least the manipulated scales of the search query into GUI data of interest representing a portion of a data record of interest that includes scale data corresponding to the manipulated scales, wherein the data record of interest includes attribute data corresponding to the attributes and scale data corresponding to scales associated with respective attributes.

In accordance with an embodiment of the presently disclosed subject matter, there is yet further provided a method, wherein the retrieving includes retrieving from a data repository GUI data representing at least one set of templates that include at least attribute data and manipulatable scale data, each set of templates representing an entity, the attribute data associated with the entity representing attributes of the entity, each manipulatable scale data representing a manipulatable scale associated with a respective attribute and signifying a level of significance of the attribute.

In accordance with an embodiment of the presently disclosed subject matter, there is yet further provided a method further comprising classifying at least one candidate data record as a respective resulting data record if the similarity indication meets a given criterion; repeating the comparison until all candidate records are compared with the data record of interest; converting each one of the resulting data records and its associated attribute data with their respective scale data into a corresponding resulting displayable GUI data and displaying the resulting displayable GUI data on the GUI of the screen.

In accordance with an embodiment of the presently disclosed subject matter, there is yet further provided a method wherein the GUI data further represent at least (i) an entity of a user, (ii) profile attributes of the user, and (iii) a manipulatable profile scale associated with a respective profile attribute and signifying a level of significance of the profile attribute;

and wherein the enabling further comprises enabling a user to perform on the GUI a manipulation of at least one manipulatable profile scale of respective profile attribute, the search query further representing the entity of the user, its profile attributes and their profile scales associated with respective profile attributes;

and wherein the GUI data of interest representing at least one data record of interest further includes profile attribute data corresponding to the profile attributes and profile scale data corresponding to profile scales associated with respective profile attributes;

and wherein the searching further comprises comparing the profile attribute data and profile scale data of the user with corresponding attribute data and scale data of the candidate data record, giving rise to a second comparison indication, and providing the similarity indication based on at least the first and second comparison indication.

In accordance with an embodiment of the presently disclosed subject matter, there is yet further provided a method, wherein the attributes are hierarchical and can be drilled down to sub-attributes associated with their respective scales, the drilling down can be performed repeatedly on the sub-attributes, and wherein the searching further comprises:

searching in the data repository for at least one candidate data record which includes at least attribute data and scale data that matches the data record of interest, including comparing similarity of the attribute data associated with their respective scale data, and the sub-attribute data associated with their respective scale data of the data record of interest with corresponding attribute data associated with their respective scale data, and the sub-attribute data associated with their respective scale data of the candidate data record, giving rise to first comparison indication, and providing similarity indication based on at least the first comparison indication.

In accordance with an aspect of the presently disclosed subject matter, there is yet further provided a computer-implemented method for displaying and manipulating a Graphic User Interface (GUI), comprising:

a) retrieving from a data repository first GUI data representing at least (i) an entity, (ii) attributes of an entity, and (iii) a manipulatable scale associated with a respective attribute and signifying a level of significance of the attribute;

b) constructing on a screen the GUI including converting the first GUI data into displayable GUI data which include at least the entity, its attributes and for at least one of the attributes a manipulatable scale and displaying the displayable GUI data including depicting the entity as a predefined shape and the attributes on the predefined shape and the manipulatable scale as sliders extending substantially from the center of the shape towards the periphery of the shape wherein the sliders comprise respective indicators indicative of the manipulatable scales that correspond to the significance of the respective attributes of the entity, enabling a user to perform on the GUI a manipulation of at least one manipulatable scale of the respective attribute by moving the indicators along the sliders, giving rise to manipulated displayable GUI data;

c) converting the manipulated displayable GUI data into second GUI data representing at least one data record that includes attribute data corresponding to the attributes and scale data corresponding to scales associated with respective attributes, and d) using the at least one data record or portion thereof for operations in the data repository.

In accordance with an embodiment of the presently disclosed subject matter, there is yet further provided a method, wherein at least one of the operations in the data repository is selected from a group comprising storing the at least one data record or portion thereof in the data repository; and searching the data repository for data matching the at least one data record or portion thereof.

In accordance with an embodiment of the presently disclosed subject matter, there is yet further provided a method, wherein the retrieving includes retrieving from a data repository first GUI data representing at least one data record that at least includes attribute data and scale data, each data record representing an entity, the attribute data associated with the entity representing attributes of the entity, each scale data representing a scale associated with a respective attribute and signifying a level of significance of the attribute; and wherein the converting includes converting at least the manipulated scales of the manipulated displayable GUI data into second GUI data representing a portion of a data record that includes scale data corresponding to the manipulated scales, wherein the data record includes attribute data corresponding to the attributes and scale data corresponding to scales associated with respective attributes, and wherein the using includes using at least the portion of the data record for operations in the data repository.

In accordance with an embodiment of the presently disclosed subject matter, there is yet further provided a method, wherein the retrieving includes retrieving from a data repository first GUI data representing at least one set of templates that include at least attribute data and manipulatable scale data, each set of templates representing an entity, the attribute data associated with the entity representing attributes of the entity, each manipulatable scale data representing a manipulatable scale associated with a respective attribute and signifying a level of significance of the attribute.

In accordance with an embodiment of the presently disclosed subject matter, there is yet further provided a computer-implemented method wherein the shape is a round.

In accordance with an embodiment of the presently disclosed subject matter, there is yet further provided a computer-implemented method wherein the moving of the indicators is performed by dragging the indicators along the sliders or by clicking at a point of the sliders and moving the indicators to the position of the point.

In accordance with an embodiment of the presently disclosed subject matter, there is yet further provided a computer-implemented method, wherein the attributes of the entity can further be displayed with respective shapes of their own characterized by sub-attributes of the attributes and scales of the sub-attributes, thereby forming layers of the shapes to represent the entity.

In accordance with an embodiment of the presently disclosed subject matter, there is yet further provided a computer-implemented method further comprising connecting the indicators next to each other with lines thereby creating an amorphic shape representing an overall preference of the user for the entity.

In accordance with an aspect of the presently disclosed subject matter, there is yet further provided a computer-implemented method for comparing similarity between an entity of interest and a candidate entity, the method comprising:

a) retrieving from a data repository data records representing the entity of interest and the candidate entity, the data records include at least attribute data, scale data and group operation data, wherein attribute data represent attributes of the entities, scale data represent scales associated with respective attributes and signifying levels of significance of the respective attributes, the attributes being classified into groups, the group operation data being indicative of different group operations within the groups, the attributes associated with the scales forming predetermined shapes on a Graphic User Interface (GUI) representing the entity of interest and the candidate entity;

b) comparing scale data associated with each attribute of the entity of interest with scale data associated with the same attribute of the candidate entity, selecting the smaller scale data of the comparison as Attribute Compare Score for each attribute;

c) if group operation data of the group that the compared attributes belong to is set to OR, calculating the ratio of the largest Attribute Compare Score within the group to the maximum scale of attributes of the same group, setting the ratio as Group Score;

otherwise the group operation data is set to AND, calculating the ratio of the sum of Attribute Compare Scores to the sum of the scale data associated with the attributes of the entity of interest, setting the ratio as Group Score, calculating all Group Scores;

d) summing up the all Group Scores as Shape Match Score, representing the similarity indication between the entity of interest and the candidate entity.

In accordance with an aspect of the presently disclosed subject matter, there is yet further provided a computer-implemented method for comparing similarity between an entity of interest and a candidate entity, the method comprising:

a) retrieving from a data repository data records representing the entity of interest and the candidate entity, the data records including at least attribute data, scale data and group operation data, wherein attribute data representing attributes of the entities, scale data representing scales associated with respective attributes and signifying levels of significance of the respective attributes, the attributes being classified into groups, the group operation data being indicative of different group operations within the groups, the attributes associated with the scales forming predetermined shapes on a Graphic User Interface (GUI) representing the entity of interest and the candidate entity; the attributes are hierarchical and can further be associated with respective shapes of their own characterized by sub-attributes of the attributes and scales of the sub-attributes, thereby forming layers of the shapes to represent the entity of interest and the candidate entity, assigning weights to the attributes, the groups and the shapes;

b) from the most outer layer of the shapes, calculating the ratio of each sub-attribute weight to the sum of all sub-attribute weights within a respective group, applying the ratio of each sub-attribute weight to the scale data of the respective sub-attribute and comparing the weighted scale data of each sub-attribute of the entity of interest to the weighted scale data of the same sub-attribute of the candidate entity, selecting the smaller scale data of the comparison as Attribute Compare Score for each sub-attribute;

c) if group operation of the group that the compared sub-attributes belong to is set to OR, calculating the ratio of the largest Attribute Compare Score within the group to the maximum scale of sub-attributes of the group, setting the ratio as Group Score;

otherwise the group operation is set to AND, calculating the ratio of the sum of Attribute Compare Scores to the sum of the scale data of the sub-attributes of the entity of interest, setting the ratio as Group Score, calculating all Group Scores;

calculating the ratio of each group weight to the sum of all group weights, applying the ratio of each group weight to the respective Group Score to obtain Weighted Group Score;

d) summing up the Weighted Group Scores in a shape as Shape Match Score, calculating all Shape Match Scores for shapes in the most outer layer that are drilled down from the same inner shape, calculating Shape Match Score for the inner shape, calculating the ratio of each shape weight to the sum of all shape weights in the most outer layer together with the inner shape weight, applying the ratio of each shape weight to the respective Shape Match Score to obtain the Weighted Shape Match Score for the inner shape, calculating Weighted Shape Match Scores for all the inner shapes;

e) repeating d) until the Weighted Shape Match Score in the most inner shape is obtained, which represents the similarity indication between the entity of interest and the candidate entity.

In accordance with an aspect of the presently disclosed subject matter, there is yet further provided a system for constructing and manipulating a Graphic User Interface (GUI), the system comprising a processor configured to perform at least the following:

retrieve from a data repository first GUI data representing at least (i) an entity, (ii) attributes of an entity, (iii) a manipulatable scale associated with a respective attribute and signifying a level of significance of the attribute;

construct on a screen the GUI including converting the first GUI data into displayable GUI data including at least the entity, its attributes and for at least one of the attributes a manipulatable scale and displaying the displayable GUI data;

enable a user to perform on the GUI a manipulation of at least one manipulatable scale of a respective attribute giving rise to manipulated displayable GUI data;

convert the manipulated displayable GUI data into second GUI data representing at least one data record that includes attribute data corresponding to the attributes and scale data corresponding to scales associated with respective attributes; and use the at least one data record or portion thereof for operations in the data repository.

In accordance with an aspect of the presently disclosed subject matter, there is yet further provided a program storage device readable by machine, tangibly embodying a program of instructions executable by the machine to perform method steps for constructing and manipulating a GUI, the method comprising:

a) retrieving from a data repository first GUI data representing at least (i) an entity, (ii) attributes of an entity, (iii) a manipulatable scale associated with a respective attribute and signifying a level of significance of the attribute;

b) constructing on a screen the GUI including converting the first GUI data into displayable GUI data which include at least the entity, its attributes and for at least one of the attributes a manipulatable scale and displaying the displayable GUI data;

c) enabling a user to perform on the GUI a manipulation of at least one manipulatable scale of a respective attribute giving rise to manipulated displayable GUI data;

d) converting the manipulated displayable GUI data into second GUI data representing at least one data record that includes attribute data corresponding to the attributes and scale data corresponding to the scales; and e) using the at least one data record or portion thereof for operations in the data repository.

In accordance with aspect of the presently disclosed subject matter, there is yet further provided a system for searching through a GUI an entity of interest that includes a plurality of attributes, the system comprising a processor configured to perform at least the following:

retrieve from a data repository GUI data representing at least (i) an entity, (ii) attributes of an entity, and (iii) a manipulatable scale associated with a respective attribute and signifying a level of significance of the attribute;

construct on a screen the GUI including converting the GUI data into displayable GUI data which includes at least the entity, its attributes and for at least one of the attributes a manipulatable scale and displaying the displayable GUI data;

enable a user to perform on the GUI a manipulation of at least one manipulatable scale of a respective attribute, giving rise to a search query representing the entity of interest, its attributes and scales associated with respective attributes;

convert the search query into GUI data of interest representing at least one data record of interest that includes attribute data corresponding to the attributes and scale data corresponding to scales associated with respective attributes;

search in the data repository for at least one candidate data record which includes at least attribute data and scale data that matches the data record of interest, including comparing similarity of the attribute data and scale data of the data record of interest with corresponding attribute data and scale data of the candidate data record, giving rise to a first comparison indication, and providing similarity indication based on at least the first comparison indication.

In accordance with an aspect of the presently disclosed subject matter, there is yet further provided a program storage device readable by machine, tangibly embodying a program of instructions executable by the machine to perform method steps for searching through a GUI an entity of interest that includes a plurality of attributes, the method comprising:

a) retrieving from a data repository GUI data representing at least (i) an entity, (ii) attributes of an entity, and (iii) a manipulatable scale associated with a respective attribute and signifying a level of significance of the attribute;

b) constructing on a screen the GUI including converting the GUI data into displayable GUI data which include at least the entity, its attributes and for at least one of the attributes a manipulatable scale and displaying the displayable GUI data;

c) enabling a user to perform on the GUI a manipulation of at least one manipulatable scale of respective attribute, giving rise to a search query representing the entity of interest, its attributes and scales associated with respective attributes;

d) converting the search query into GUI data of interest representing at least one data record of interest that includes attribute data corresponding to the attributes and scale data corresponding to scales associated with respective attributes;

e) searching in the data repository for at least one candidate data record which includes at least attribute data and scale data that matches the data record of interest, including comparing similarity of the attribute data and scale data of the data record of interest with corresponding attribute data and scale data of the candidate data record, giving rise to a first comparison indication, and providing similarity indication based on at least the first comparison indication.

In accordance with an aspect of the presently disclosed subject matter, there is yet further provided a system for displaying and manipulating a GUI, the system comprising a processor configured to perform at least the following:

retrieve from a data repository first GUI data representing at least (i) an entity, (ii) attributes of an entity, and (iii) a manipulatable scale associated with a respective attribute and signifying a level of significance of the attribute;

construct on a screen the GUI including converting the first GUI data into displayable GUI data which include at least the entity, its attributes and for at least one of the attributes a manipulatable scale and displaying the displayable GUI data including depicting the entity as a predefined shape and the attributes on the predefined shape and the manipulatable scale as sliders extending substantially from the center of the shape towards the periphery of the shape wherein the sliders comprise respective indicators indicative of the manipulatable scales that correspond to the significance of the respective attributes of the entity, enabling a user to perform on the GUI a manipulation of at least one manipulatable scale of respective attribute by moving the indicators along the sliders, giving rise to manipulated displayable GUI data;

convert the manipulated displayable GUI data into second GUI data representing at least one data record that includes attribute data corresponding to the attributes and scale data corresponding to scales associated with respective attributes, and use the at least one data record or portion thereof for operations in the data repository.

In accordance with an aspect of the presently disclosed subject matter, there is yet further provided a program storage device readable by machine, tangibly embodying a program of instructions executable by the machine to perform method steps for displaying and manipulating a GUI, the method comprising:

a) retrieving from a data repository first GUI data representing at least (i) an entity, (ii) attributes of an entity, and (iii) a manipulatable scale associated with a respective attribute and signifying a level of significance of the attribute;

b) constructing on a screen the GUI including converting the first GUI data into displayable GUI data which include at least the entity, its attributes and for at least one of the attributes a manipulatable scale and displaying the displayable GUI data including depicting the entity as a predefined shape and the attributes on the predefined shape and the manipulatable scale as sliders extending substantially from the center of the shape towards the periphery of the shape wherein the sliders comprise respective indicators indicative of the manipulatable scales that correspond to the significance of the respective attributes of the entity, enabling a user to perform on the GUI a manipulation of at least one manipulatable scale of respective attribute by moving the indicators along the sliders, giving rise to manipulated displayable GUI data;

c) converting the manipulated displayable GUI data into second GUI data representing at least one data record that includes attribute data corresponding to the attributes and scale data corresponding to scales associated with respective attributes, and d) using the at least one data record or portion thereof for operations in the data repository.

BRIEF DESCRIPTION OF THE DRAWINGS

In order to understand the presently disclosed subject matter and to see how it may be carried out in practice, the subject matter will now be described, by way of examples only, with reference to the accompanying drawings, in which:

FIGS. 2E-2J illustrate an example of one-to-many attribute-group trade-off mode in accordance with the presently disclosed subject matter.

FIGS. 5A-5C illustrate a template structure that represents the data schemes of an entity, its attribute groups and attributes in a data repository in accordance with the presently disclosed subject matter.

FIG. 6 is a flowchart illustrating a sequence of operations for constructing and manipulating a GUI in accordance with the presently disclosed subject matter.

FIGS. 13A-13C show one example for illustrating the search and comparison in accordance with the presently disclosed subject matter.

DETAILED DESCRIPTION

Figure 1:
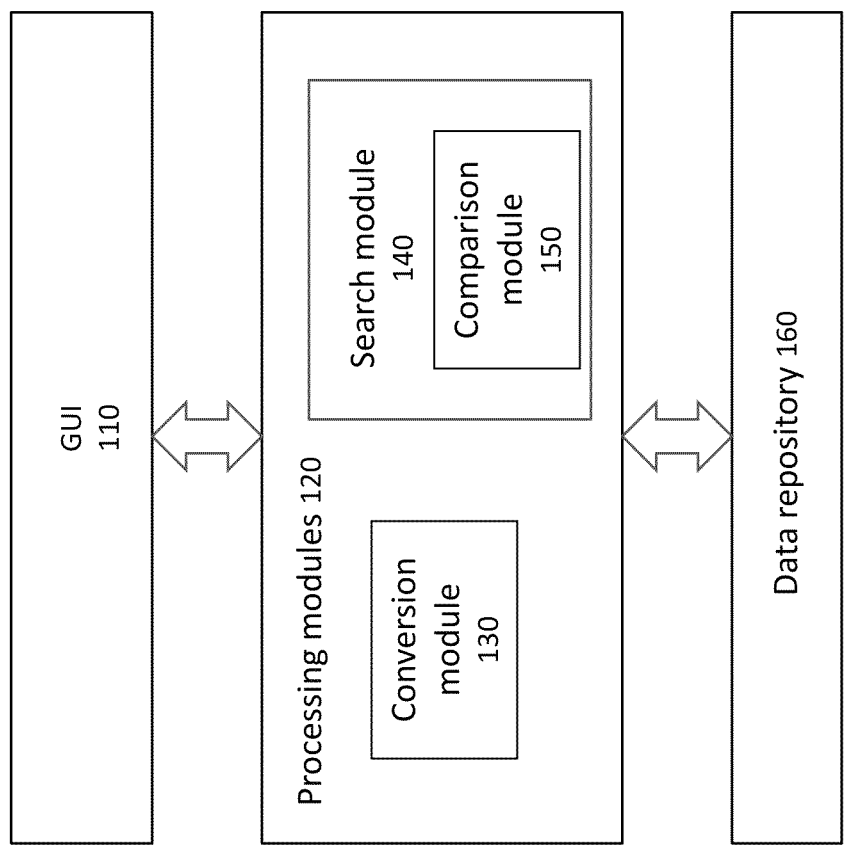
FIG. 1 is a block diagram schematically illustrating a generalized system architecture for searching through a Graphic User Interface (GUI), in accordance with the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "retrieving", "constructing", "enabling", "converting", "storing", "displaying", "calculating", "searching", "comparing", "classifying", "manipulating", "providing" or the like, include action and/or processes of a computer that manipulate and/or transform data into other data, said data represented as physical quantities, e.g. such as electronic quantities, and/or said data representing the physical objects. The term "computer" should be expansively construed to cover any kind of electronic device with data processing capabilities, including, by way of example, a personal computer, a server, a computing system, a communication device, a processor (e.g. digital signal processor (DSP), a microcontroller, a field programmable gate array (FPGA), an application specific integrated circuit (ASIC), etc.), any other electronic computing device, and or any combination thereof The operations in accordance with the teachings herein may be performed by a computer specially constructed for the desired purposes or by a general purpose computer specially configured for the desired purpose by a computer program stored in a computer readable storage medium.

As used herein, the phrase "for example," "such as", "for instance" and variants thereof describe certain embodiments of the presently disclosed subject matter. Reference in the specification to "one case", "some cases" or variants thereof means that a particular feature, structure or characteristic described in connection with the embodiment(s) is included in at least one embodiment of the presently disclosed subject matter. Thus the appearance of the phrase "one case", "some cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 7:
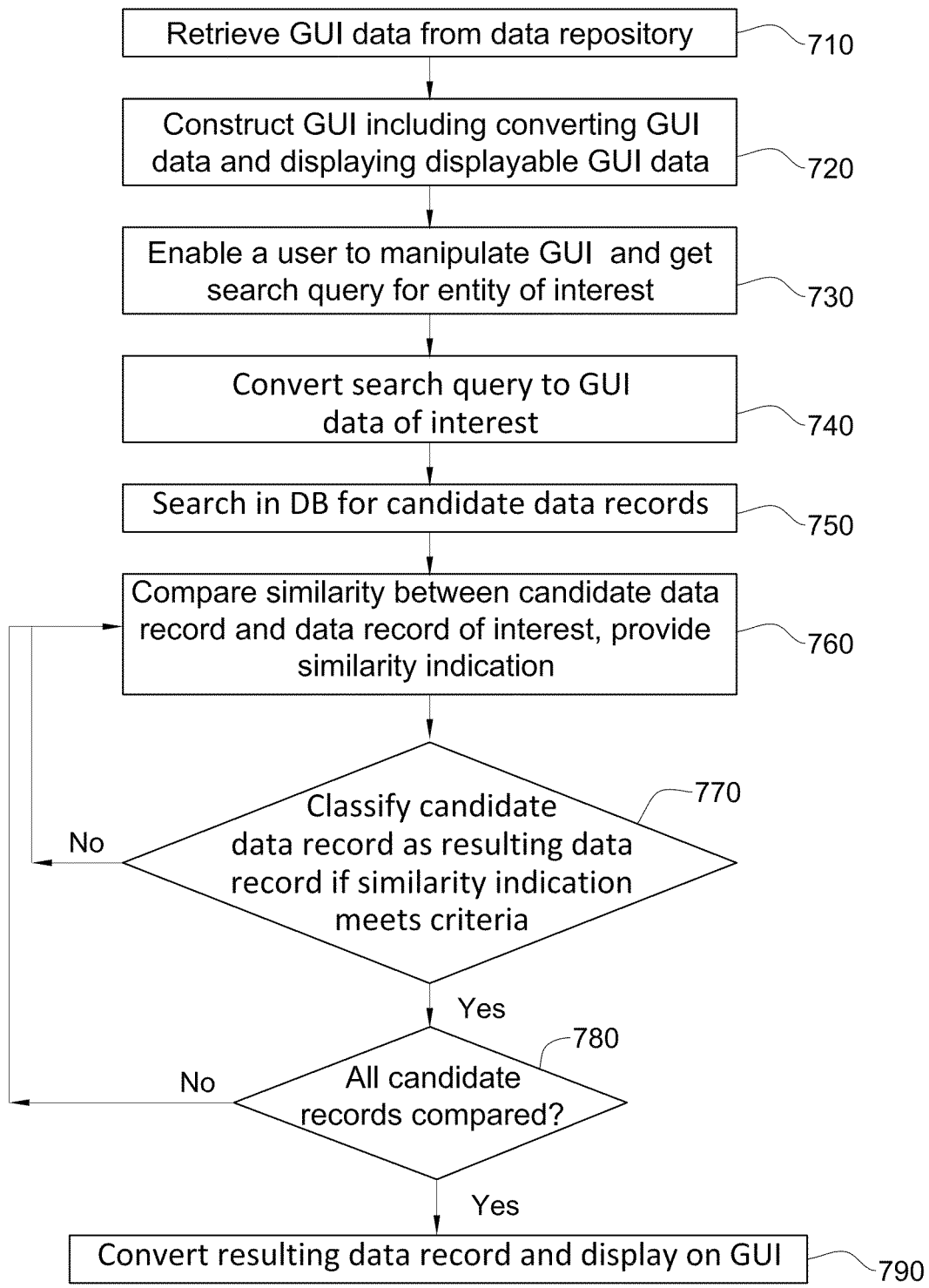
FIG. 7 is a flowchart illustrating a sequence of operations for searching through a GUI an entity of interest that includes a plurality of attributes, in accordance with the presently disclosed subject matter.
Figure 12:
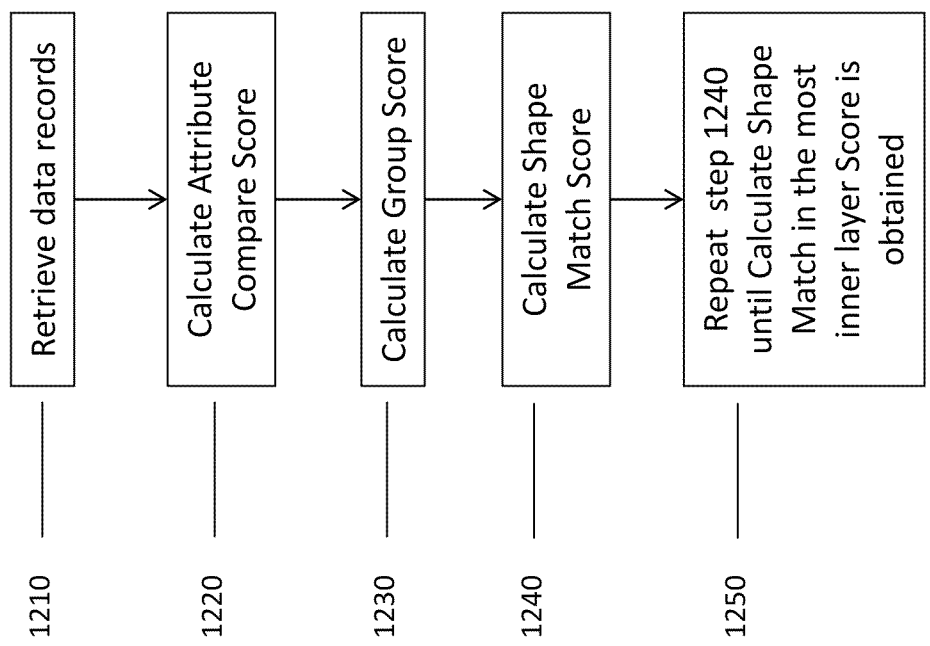
FIG. 12 is a flowchart of a comparison sequence of operations between an entity of interest and a candidate entity in accordance with the presently disclosed subject matter.

In embodiments of the presently disclosed subject matter, fewer, more and/or different stages than those shown in FIGS. 6, 7 and 12 may be executed. In embodiments of the presently disclosed subject matter one or more stages illustrated in FIGS. 6, 7 and 12 may be executed in a different order and/or one or more groups of stages may be executed simultaneously. FIG. 1 illustrates a general schematic of the system architecture in accordance with an embodiment of the presently disclosed subject matter. Each module in FIG. 1 can be made up of any combination of software, hardware and/or firmware that performs the functions as defined and explained herein. The modules in FIG. 1 may be centralized in one location or dispersed over more than one location. In other embodiments of the presently disclosed subject matter, the system may comprise fewer, more, and/or different modules than those shown in FIG. 1.

Bearing this in mind, attention is drawn to FIG. 1, illustrating a generalized system architecture for searching through a Graphic User Interface (GUI), in accordance with the presently disclosed subject matter. As shown, the system comprises three main parts: GUI module 110, processing modules 120 and data repository 160. Processing modules 120 further comprise conversion module 130, search module 140 and comparison module 150, which are configured to receive instructions and to manage, control and execute operations (e.g. a digital signal processor (DSP), a microcontroller, a field programmable gate array (FPGA), an application specific integrated circuit (ASIC), etc). Data repository 160 stores and enables retrieval of various data for processing modules 120 to process and for GUI module 110 to display.

In accordance with certain embodiments, GUI module 110 allows a user to interact on a screen with graphical labels and visual indicators to construct an entity and its associated attributes with their respective scales, and enables a user to manipulate the scales to signify the levels of significance of their associated attributes, thereby representing an entity of interest that the user wants to define or search for and giving rise to a search query. Conversion module 130 retrieves first GUI data from a data repository 160 and converts the GUI data into displayable GUI data including the entity and its attributes with their respective scales. The first GUI data herein represent at least an entity, attributes of the entity and a manipulatable scale associated with a respective attribute and signifying a level of significance of the attribute, as will be explained in greater detail with reference to FIG. 6. Conversion module 130 also receives graphical information such as displayable GUI data from GUI module 110 and converts the displayable GUI data including the entity, its associated attributes and for at least one of the attributes a manipulatable scale into second GUI data representing at least one data record which include attribute data corresponding to the attributes and scale data corresponding to the scales. Search module 140 searches in data repository 160 for a candidate data record that matches a data record of interest that represent the search query, and calls the Comparison module 150 to compare the similarity of the attribute data and scale data of the data record of interest with corresponding attribute data and scale data of the candidate data record in the data repository 160, and provide similarity indication based on at least this comparison, as will be explained in greater detail below.

It is to be noted that processing modules 120 in some cases can be distributed over several locations. In addition, processing modules 120 and/or data repository 160 can in some cases be cloud-based.

GUI module 110 can be displayed on a screen of for example PDAs, tablet computers (e.g. APPLE® IPAD®), personal computers, laptop computers, cellular phones, smart phones (e.g. IPHONE®, BLACKBERRY®, etc), or any other device suitable to display such GUI which may employ a touch screen.

Those versed in the art will readily appreciate that the present disclosure is not bound by the specific system architecture described with reference to FIG. 1.

Figure 2A:
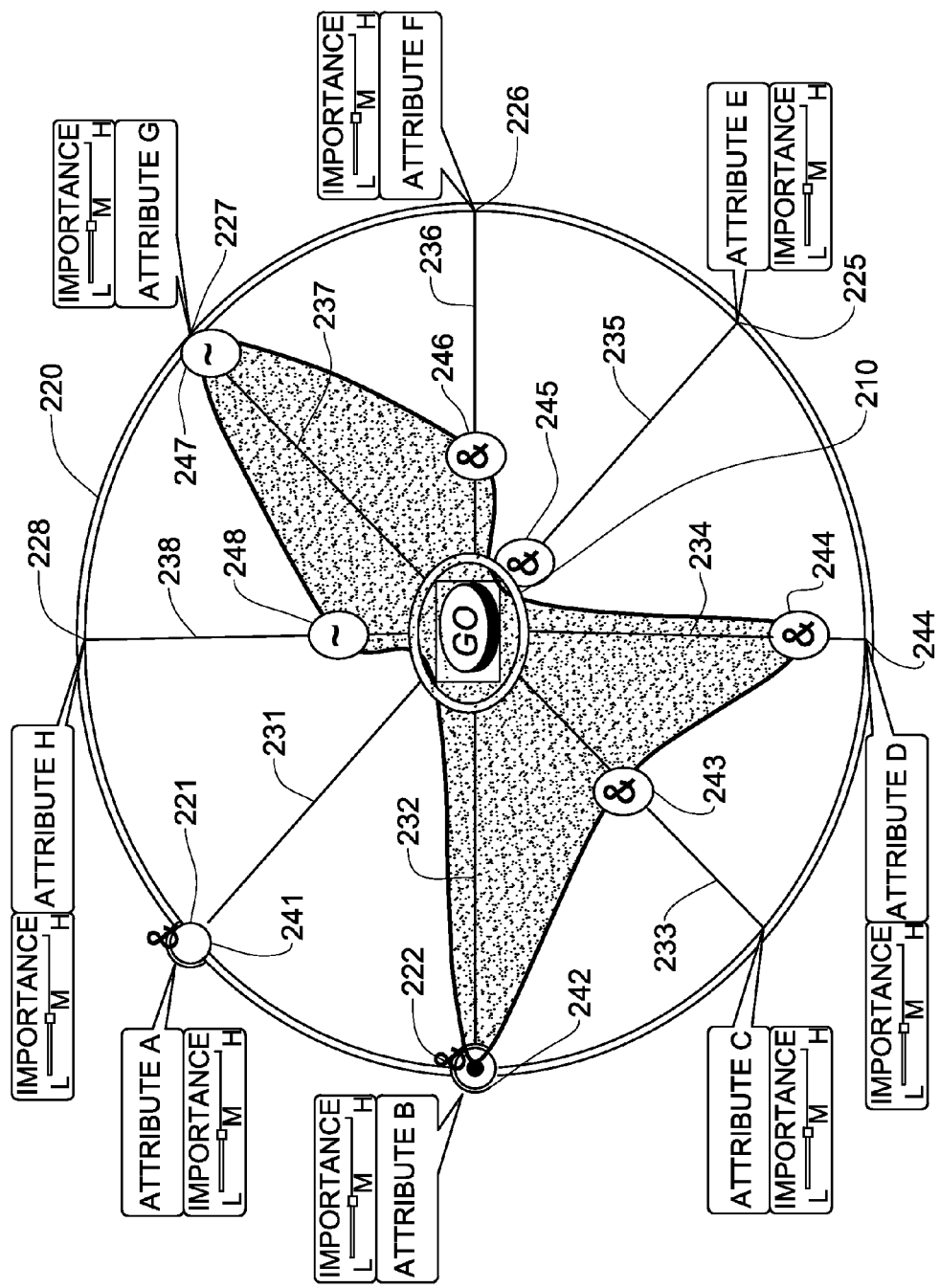
FIG. 2A is a schematic illustration of one example of a GUI for a user to construct and manipulate to represent an entity, in accordance with the presently disclosed subject matter.

FIG. 2A is a schematic illustration of one example of a GUI for a user to construct and manipulate to represent an entity, in accordance with the presently disclosed subject matter.

As shown, an entity 210 is graphically displayed as a certain shape 220 on the GUI. The entity 210 can be defined with a set of attributes (e.g. Attributes 221-228) which represent different features of the entity. A user can for instance express his/her opinions, wishes, preferences, define his/her needs and specify search queries through the entity and its attributes. The attributes 221-228, namely attribute A-H are displayed as labels (labels being an example as an attribute indicator) on the predefined shape 220 on the GUI, for example on the periphery of the shape. Note that the number of attributes which define the entity is not fixed and can be determined in accordance with a user's needs to describe the entity. Each attribute has a respective slider (e.g. sliders 231-238) that extends substantially from the center of the shape 220 towards the periphery of the shape 220. Each slider comprises an indicator (e.g. indicators 241-248) indicative of a manipulatable scale that corresponds to the significance of the respective attribute of the entity. A user can manipulate at least one manipulatable scale of an attribute by dragging the indicators 241-248 along the sliders 231-238 or by clicking at a point of the sliders 231-238 and moving the indicators 241-248 to the position of the point. In one embodiment the manipulation may trigger an automatic manipulation of at least one other scale of another attribute. In another embodiment, the indicators can be connected next to each other with lines thereby creating an amorphic shape representing an overall preference of the user for the entity.

By way of examples the shape 220 can be predetermined as any kind of shape such as an oval, a polygon, a round or an irregular shape, etc. The entity 210 can be for example merchandise, business, a person, service, media, a hobby, an activity, a place, a topic, a website, emotional expression, status, preference or any other items suitable to be represented and displayed on the GUI.

It is noted that the scales associated with respective attributes can be for instance numeric or Boolean depending on the nature and definition of the attributes. In accordance with one embodiment, the scales are numeric and can range e.g. from 0 to 100 or from −50 to 50, as shown in attributes 223-228 in FIG. 2. In accordance with another embodiment, the scales are Boolean and the possible values of the scales are 1 or 0, which mean a user either picks the attribute or doesn't pick the attribute, as can be seen in attributes 221-222 in FIG. 2. In this case, indicators 241-242 are displayed as option buttons on the periphery of the shape 220 and are overlapped with the attributes 221-222, which allows a user to choose only one of a predefined set of options. According to other embodiments, the indicators 241-242 can be displayed as checkboxes which allows a user to make multiple selections from a number of options, as will be explained in greater detail below.

In accordance with a certain embodiment, clicking on at least one of the attributes on the predefined shape affects at least one other scale of another attribute according to an adjustment logic. For instance, assume that the entity is certain content on the Internet, and the attributes of the entity are expressions and emotions for users to express their feelings and opinions with regard to the entity. A user has the option to express his/her emotions in an efficient way e.g. within the first few clicks on the GUI. For example, the user can first click on one attribute (e.g. on the label of the attribute) that he most agrees with, and the scale of the clicked attribute will accordingly increase to a certain percentage (e.g. a predefined percentage such as the maximum of the scale). Secondly he clicks on another attribute that he also agrees with but feels less strong about, and according to an adjustment logic between these two attributes, the scales of the first clicked and second clicked attributes will both adjust. The user can choose to do a third click, and accordingly all the scales of the clicked attributes will adjust again by the adjustment logic. The adjustment logic can be implemented by way of examples as correlation logic between the attributes, as will be explained in greater detail with reference to FIGS. 2E-2J. Note that the number of clicks and the adjustment logic should not be construed as limiting, but are provided for exemplary purposes only.

Having described the attributes of the entity and their respective scales in accordance with certain embodiments, groups of attributes with certain manipulation mode are now described.

Figure 2B:
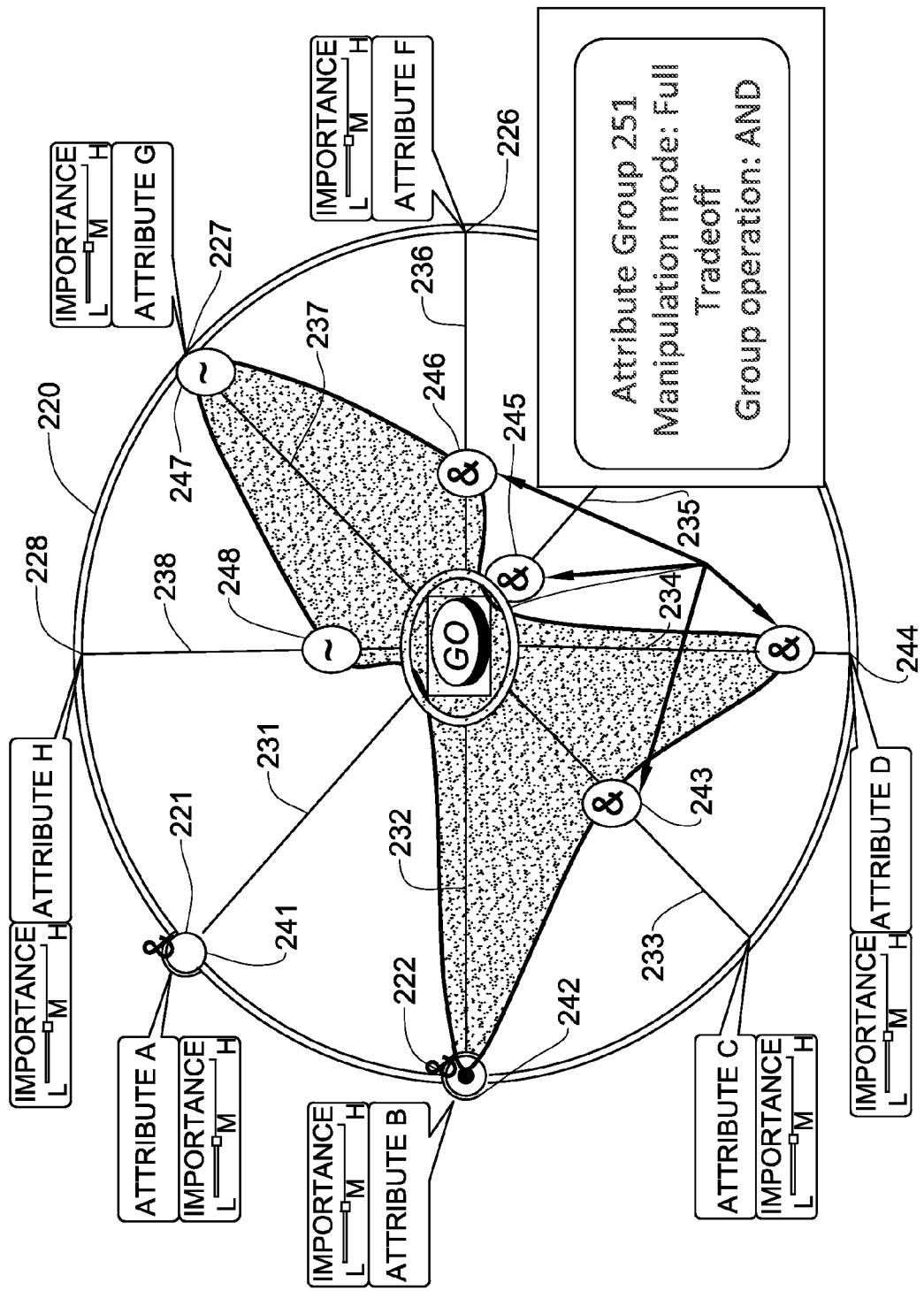
FIG. 2B illustrates an attribute group with full trade-off manipulation mode on the GUI in accordance with the presently disclosed subject matter.

Turning now to FIG. 2B, there is shown an attribute group with full trade-off manipulation mode on the GUI in accordance with the presently disclosed subject matter. In one embodiment, the attributes 221-228 of the entity 210 can be classified into a plurality of groups within which there are certain manipulation modes that affect the scales associated with attributes within the same group. The manipulation modes enable the automatic balance (also referred to as automatic manipulation below) of scales of attributes that are related to each other within a group, wherein the automatic balance is triggered by a user's manipulation of at least one scale of an attribute. For example, in FIG. 2B, attributes 223-226, namely attributes C-F are classified into the same group 251. The manipulation mode for group 251 is set as full trade-off, which means that the sum of the scales of the attributes within the group is fixed and will remain fixed while at least one scale of an attribute is being adjusted. In accordance with certain embodiments, the sum of the scales is set by the equation:

$$\text{sum} = (\text{maximum value of the scales} + \text{minimum value of the scales})/2 * \text{the number of attributes within a group}.$$

For example, in attribute group 251, if the scales of attributes 223-226 range from 0 to 100, the maximum value of the scales is 100, the minimum value of the scales is 0, and the sum of these attributes amounts for $(0+100)/2*4=200$. If the scales of attributes 223-226 range from −50 to 50, the sum of these attributes should remain as $(-50+50)/2*4=0$, no matter how a user manipulates one or more scales of these attributes.

There follows now the description of the calculation logic in which the automatic manipulation of full trade-off manipulation mode works. In accordance with the example given above, in which the scales of attributes 223-226 range from 0 to 100 and the sum of these attributes remains 200, assume that the scales of attribute 223-226 are respectively 60, 40, 80 and 20. If a user manipulates the scale of attribute 225 by decreasing it from 80 to 50, one embodiment would be that attributes 223, 224 and 226 will increase equally the same amount, which in this case is (80-50)/3=10. Therefore after the automatic manipulation, the scales of attributes 223-226 will be displayed respectively as 70, 50, 50 and 30. Another embodiment would be that the attributes 223, 224 and 226 will increase in proportion to their respective scales, which in this case would be 30*60/(60+40+20)=15 for attribute 223, 30*40/(60+40+20)=10 for attribute 224, and 30*20/(60+40+20)=5 for attribute 226. Therefore after the automatic manipulation, the scales of attributes 223-226 will be displayed respectively as 75, 50, 50, and 25.

Those versed in the art will readily appreciate that the specified examples of the full trade-off manipulation are provided for illustrative purposes only and are by no means inclusive of all possible calculation logic under this mode.

Figure 2C:
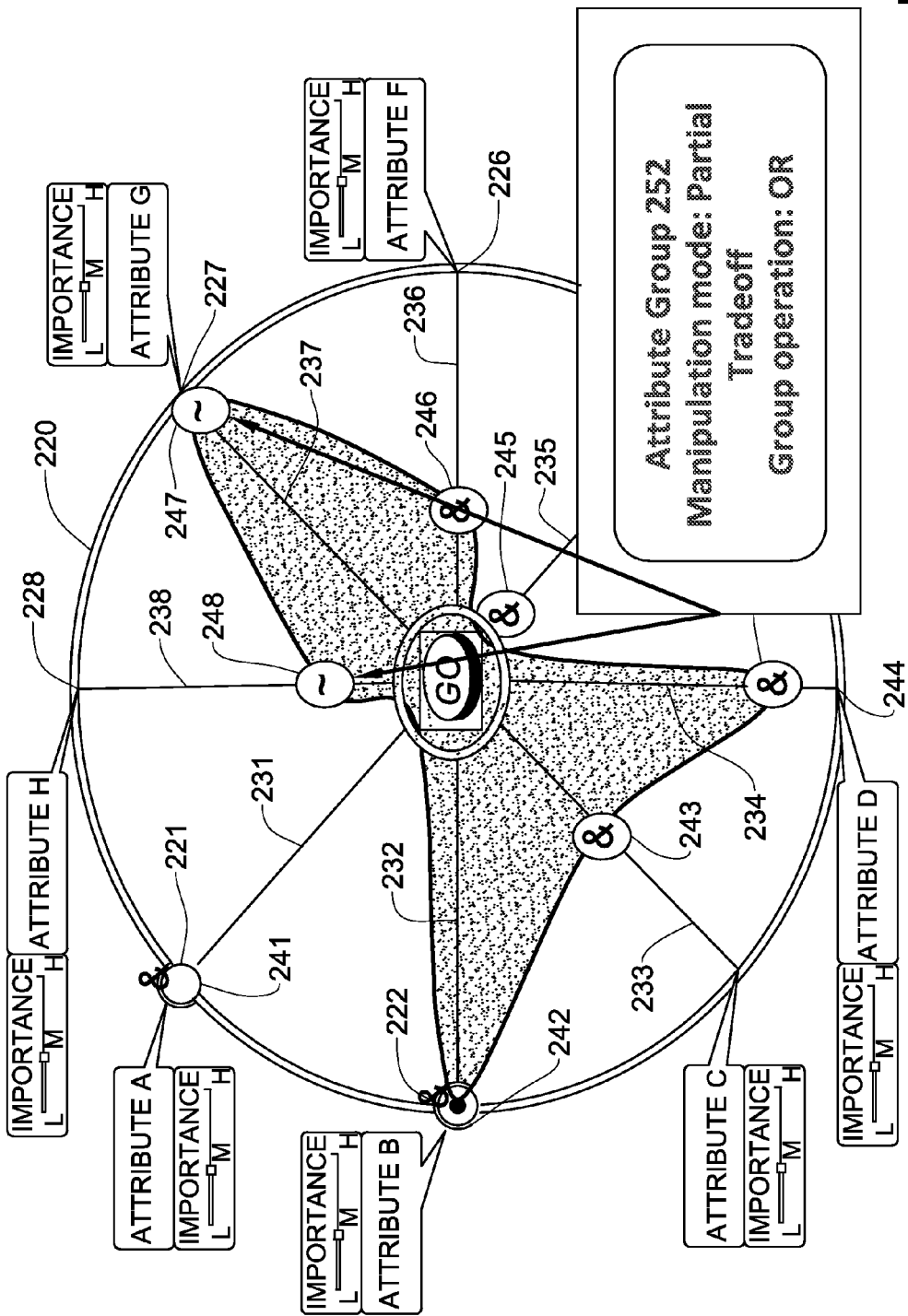
FIG. 2C illustrates an attribute group with partial trade-off manipulation mode on the GUI in accordance with the presently disclosed subject matter.

Attention is now drawn to FIG. 2C showing an attribute group with partial trade-off manipulation mode on the GUI in accordance with the presently disclosed subject matter. As shown in FIG. 2C, attributes 227-228, namely attributes G-H are classified into the same group 252. The manipulation mode for group 252 is set as partial trade-off, which means that the sum of the scales of the attributes within the group is between an upper threshold (trade-off sum max) and a lower threshold (trade-off sum min) while at least one scale of an attribute is being adjusted. The upper threshold and lower threshold can be defined by a system administrator according to different attribute groups. In one embodiment the trade-off sum max and the trade-off sum min by default are both set as:

Trade-off sum max/trade-off sum min=(maximum value of the scales+minimum value of the scales)/2*the number of attributes within a group.

In accordance with certain embodiments, in attribute group 252 in which the scales of attributes 227-228 range from 0 to 100, assume that the trade-off sum max of these attributes is set as 100, the trade-off sum min is set as 20, and the scales of attribute 227-228 are respectively 60 and 20. If a user manipulates the scale of attribute 228 by increasing it from 20 to 30, the scale of attribute 227 stays with the same value 60, since the sum of attributes in this group now is 90 which is still within the scope of (20, 100). But if the user increases the scale of attribute 228 from 20 to 50, the scale of attributes 227 will decrease from 60 to 50, to make sure the sum of scales of these attributes will not exceed the trade-off sum max 100. And it works the same with the trade-off sum min.

Those versed in the art will readily appreciate that the present disclosure is not bound by these particular examples.

Figure 2D:
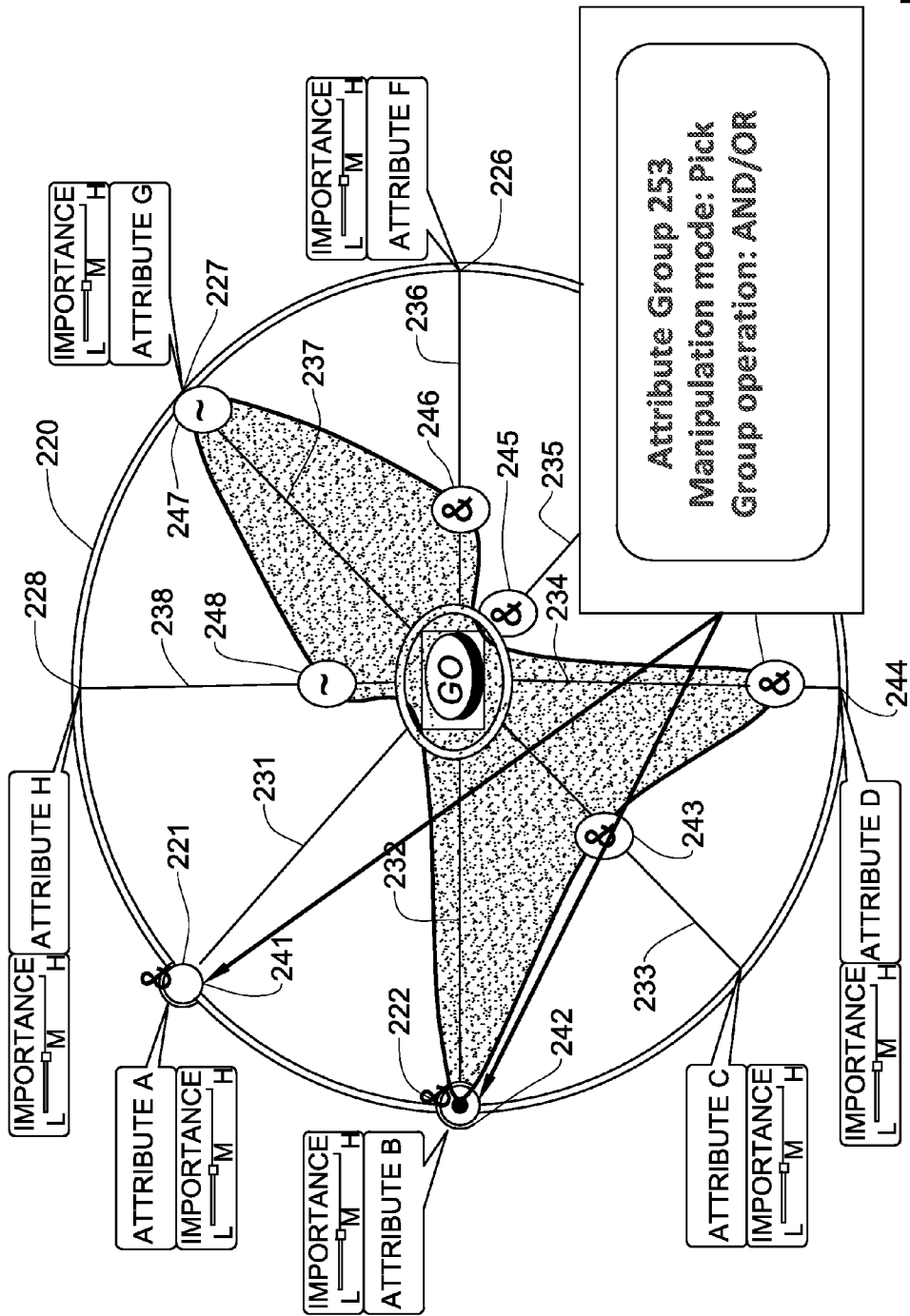
FIG. 2D illustrates an attribute group with pick manipulation mode on the GUI in accordance with the presently disclosed subject matter.

With references now to FIG. 2D, there is shown an attribute group with pick manipulation mode on the GUI in accordance with the presently disclosed subject matter. As shown in FIG. 2D, attributes 221-222, namely attributes A-B are classified into the same group 253. The manipulation mode for group 253 is set as Pick. The value of the scales within the group is Boolean which means the scale of an attribute within the group is set to 1 when the attribute is picked by the user, and is set to 0 when it is not picked. In accordance with certain embodiments, there is an upper limit of the maximum number of picked attributes within the group defined as Pick Limit, which allows a user to make one or multiple selections from a number of predefined options.

For example, in attribute group 253, attribute 221 is not picked thus its value is 0; while attribute 222 is picked thus its value is 1. The Pick Limit in this group is set as 1, so it is not possible to pick both attribute 221 and 222.

Those versed in the art will readily appreciate that the examples discussed above (with reference to manipulation modes in attribute groups 251-253) and with reference to FIGS. 2B-2D are by no means binding, and accordingly other ways of manipulation may be used in addition to or in lieu of the above.

Thus, in accordance with certain embodiments of the presently disclosed subject matter, the manipulation mode may be defined as opposite trade-off mode wherein at least one scale of an attribute within a group correlates positively with at least one other scale of another attribute within the same group. For example, there are two attributes "quality" and "price" in one group, which might be in opposite trade-off since high quality usually means high price. This can be achieved, by way of example, by defining the "price" attribute with an opposite scale as to the "quality" attribute.

In another embodiment, the manipulation mode may be defined as one-to-many attribute-group trade-off mode wherein automatic manipulation may affect at least one scale associated with an attribute not within the group to which the attribute associated with the manipulated scales belongs.

FIGS. 2E-2J illustrate an example of the one-to-many attribute-group trade-off mode in accordance with the presently disclosed subject matter. The entity represented by a polygon here can refer to any content on the Internet, for instance a post on Facebook, an article of a newspaper, or any other suitable subject matter that users can express their emotions and expressions on. As shown in FIG. 2E, there are eight emotional attributes of the entity which are classified into four groups with a manipulation mode of partial trade-off: (funny, sad), (exciting, boring), (annoying, inspiring) and (empathic, disappointing). FIG. 2I shows the correlation coefficients between any two of these attributes, which means each attribute is correlated to any other attribute to some extent defined by the correlation coefficient between them, no matter if they are within the same group or not. For example, the correlation coefficient between "funny" and "sad" is set as −0.9, and the correlation coefficient between "funny" and "exciting" is set as 0.5. If a user manipulates a scale of one attribute, all the other scales will be affected and adjust in accordance with the coefficients in FIG. 2I. FIG. 2E shows the initial default status of the entity, with all the scales of the attributes set to e.g. 50, as shown as "Status Zero" in FIG. 2E. The "Trade-off sum min" is for instance set as 80 and the "Trade-off sum max" is for instance set as 120 for all the groups. Turning now to FIG. 2F, assume a user changes the scale of attribute "funny" from 50 to 90. The scale of attribute "sad" will change accordingly by the amount of (90−50)*(−0.9)=−36, which becomes 50+(−36)=−14. Similarly, all the other scales will change in the same manner, as shown in the column "Funny+40" in FIG. 2J. Next the sum of the scales of attributes in each group will be calculated and verified by being compared with the "Trade-off sum min" and "Trade-off sum max". For instance in group (exciting, boring), after the correlation, the sum of the scales of "exciting" and "boring" becomes 70+58=128, which exceeds the defined "Trade-off sum max" value by 128−120=8. As shown in column "Trade-off A", after considering the partial trade-off manipulation mode, the scales of "exciting" and "boring" will adjust by the same amount respectively to 70−8/2=66 and 58−8/2=54. The other two groups will adjust as well accordingly and the adjusted status is shown in FIG. 2F. There are shown two more examples in FIG. 2G and FIG. 2H of decreasing the scale of "exciting" from 70 to 40, and increasing the scale of "inspiring" from 50.4 to 100, and the correlation results are calculated in the same manner as shown in FIG. 2J.

Those versed in the art will readily appreciate that the specified examples of the one-to-many attribute-group trade-off mode are by no means inclusive of all possible calculation logic under this mode but are intended to illustrate non-limiting examples.

In one embodiment, an attribute and a group can be respectively assigned with a weight based on a user's preferences, signifying for example a higher importance (higher weight) compared to lower importance (lower weight).

It is noted in accordance with certain embodiments that there is group operation between attributes within a group (e.g. the group operation in group 251 is AND, and OR in group 252), which applies as an operation (possibly logical operation) when one entity together with its attributes is compared to another, as will be explained in greater detail below.

It is to be noted that there is mentioned above an entity, groups of attributes and attributes with their respective scales that can be constructed and displayed on the GUI, but there may also be other features, whether manipulatable or not, that may be added to the GUI which have their corresponding representation in the data repository. For the purpose of simplicity, the description will focus on the specific example of a GUI with features of entity, groups of attributes and attributes with their respective scales.

Figure 3A:
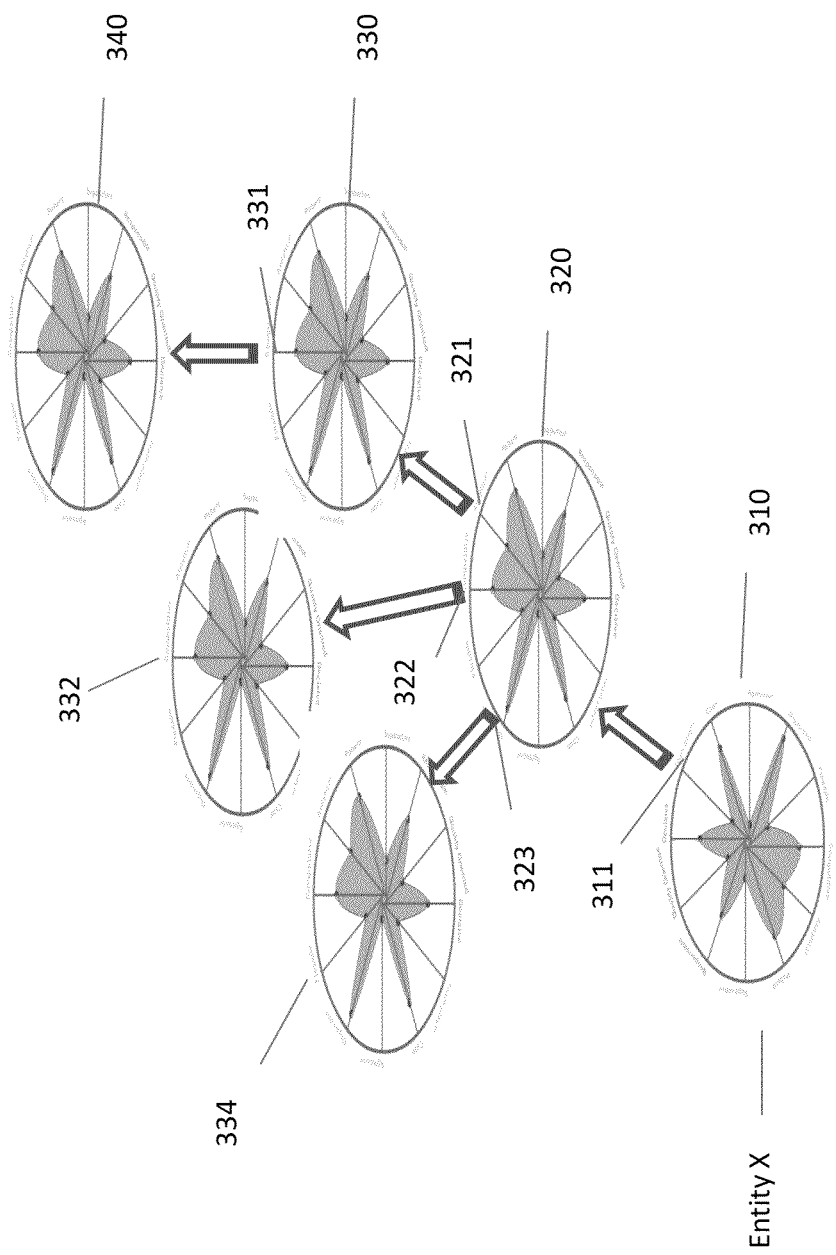
FIG. 3A illustrates graphically a hierarchical structure of an entity and its associated attributes, in accordance with the presently disclosed subject matter.

Bearing this in mind, attention is directed to FIG. 3A, illustrating graphically a hierarchical structure of an entity and its associated attributes, in accordance with the presently disclosed subject matter. As shown in FIG. 3A, an entity X and its associated set of attributes are displayed on the periphery of a shape 310 (in this case a round) in the way described in FIG. 2A. As shown, each of these attributes is hierarchical and can be drilled down to additional sub-attributes with their respective scales by displaying to a user sub-attributes of the selected attribute on a shape in response to the user's selection of the attribute. The drilling-down enables users to specify their different needs such as wishes, emotions, opinions, preferences or queries to define, and to express or search for the entities of their interest. As shown, attribute 311 of entity X on round 310, which is the main round, is further drilled down to its own sub-attributes forming another round 320, which will be displayed to a user in response to the user's selection of attribute 311. Furthermore, sub-attributes 321, 322 and 323 of attribute 311 are further drilled down to another sub-layer of sub-attributes, represented respectively by rounds 330, 332 and 334, among which sub-attribute 331 is again drilled down to its own round 340, which is the leaf round in the hierarchical structure of entity X. In this hierarchical structure of entity X, the lower levels (also termed inner levels) correspond to more general attributes while the upper levels (also termed outer levels) correspond to more specific attributes of the entity. The drilling down centers from the entity and extends outwards layer by layer with sub-attributes, in which the entity can be described in great detail.

In accordance with a certain embodiment, the drilling-down history from the main round to the leaf round can be shown as a navigation thread on the GUI beside the display of the rounds, represented by rows of different layers of rounds being connected. For instance, each row can present rounds on a different layer in the hierarchical structure including round names, their groups and attributes. Different rows are connected by arrows or lines as a thread starting from the first attribute that is drilled down towards the next layer of round, and finishing until the leaf round.

Note that the invention is not bound by the specific hierarchical structure depicted in FIG. 3A and likewise not by the specific layout of displaying the hierarchy on the screen. The latter may depend for example on the available real-estate on the screen and possibly other considerations.

Figure 3C:
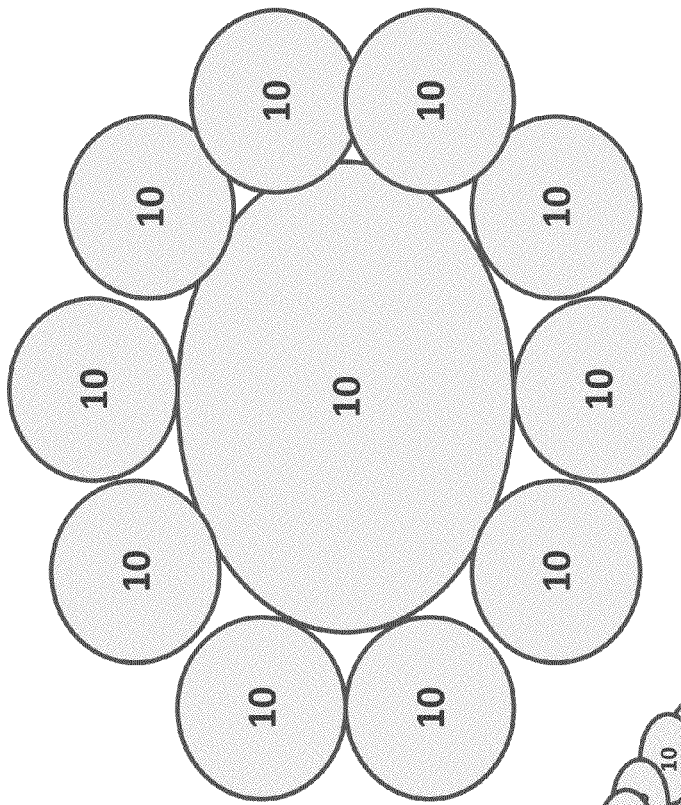
FIGS. 3B-3D illustrate graphically a generalized drilling down of an entity in accordance with the presently disclosed subject matter.
Figure 3B:
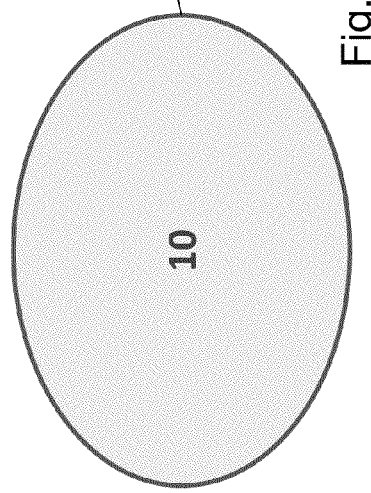
Figure 3D:
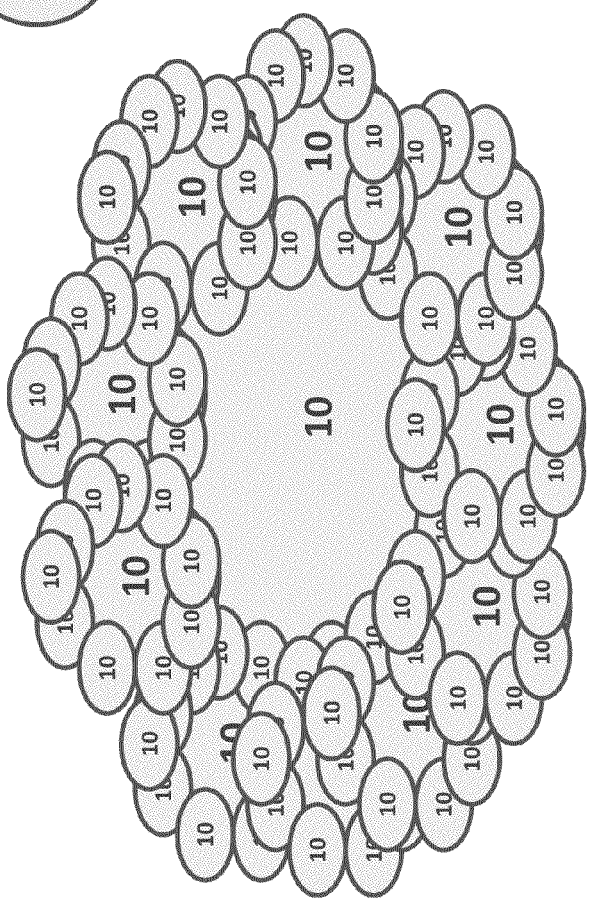

Turning now to FIGS. 3B-3D, which illustrate graphically a generalized drilling down of an entity in accordance with the presently disclosed subject matter, entity X is comprised of 10 attributes, as shown in the first layer of drilling down in FIG. 3B. Each of the 10 attributes is further drilled down to 10 sub-attributes, as shown in the second layer of drilling down in FIG. 3C, resulting in a total of 10*10+10=110 attributes to describe the entity X. Thus, after the third layer of drilling down, as shown in FIG. 3D, there are 10*10*10+110=1110 attributes in total, corresponding to users' different definitions of an entity or different search queries. The drilling down process can be performed repeatedly on sub-attributes for further layers of sub-attributes displayed on respective shapes until the user's needs to define the entity of interest are fulfilled. In one embodiment, each shape representing a layer of sub-attributes can be assigned with a weight based on a user's preferences. The invention is of course not bound by the specified drilling down sequence. For instance, not every attribute needs to be drilled down for the full n (by this example 10) sub attributes.

Having described the graphical display of an entity, its associated attributes and attribute groups on a GUI in accordance with certain embodiments above, data structure of an entity, its associated attributes and attribute groups is now described.

In accordance with one embodiment, when a user wishes to define an entity, search for an entity of interest or express for instance his/her wishes, emotions, opinions etc. in accordance with the presently disclosed GUI, corresponding first GUI data will be retrieved from a data repository representing at least an entity, its attributes and manipulatable scales associated with respective attributes. The first GUI data will be converted to displayable GUI data that will be displayed. After the user's manipulation of the displayable GUI data, the manipulated displayable GUI data will be converted again to second GUI data. The second GUI data will either be stored back to the data repository or be used as GUI data of interest to search for a matching GUI data in the data repository. Those versed in the art will readily appreciate that the invention is not bound by any particular manner of implementing the data repository as will be explained in greater detail in FIG. 6.

Figure 4:
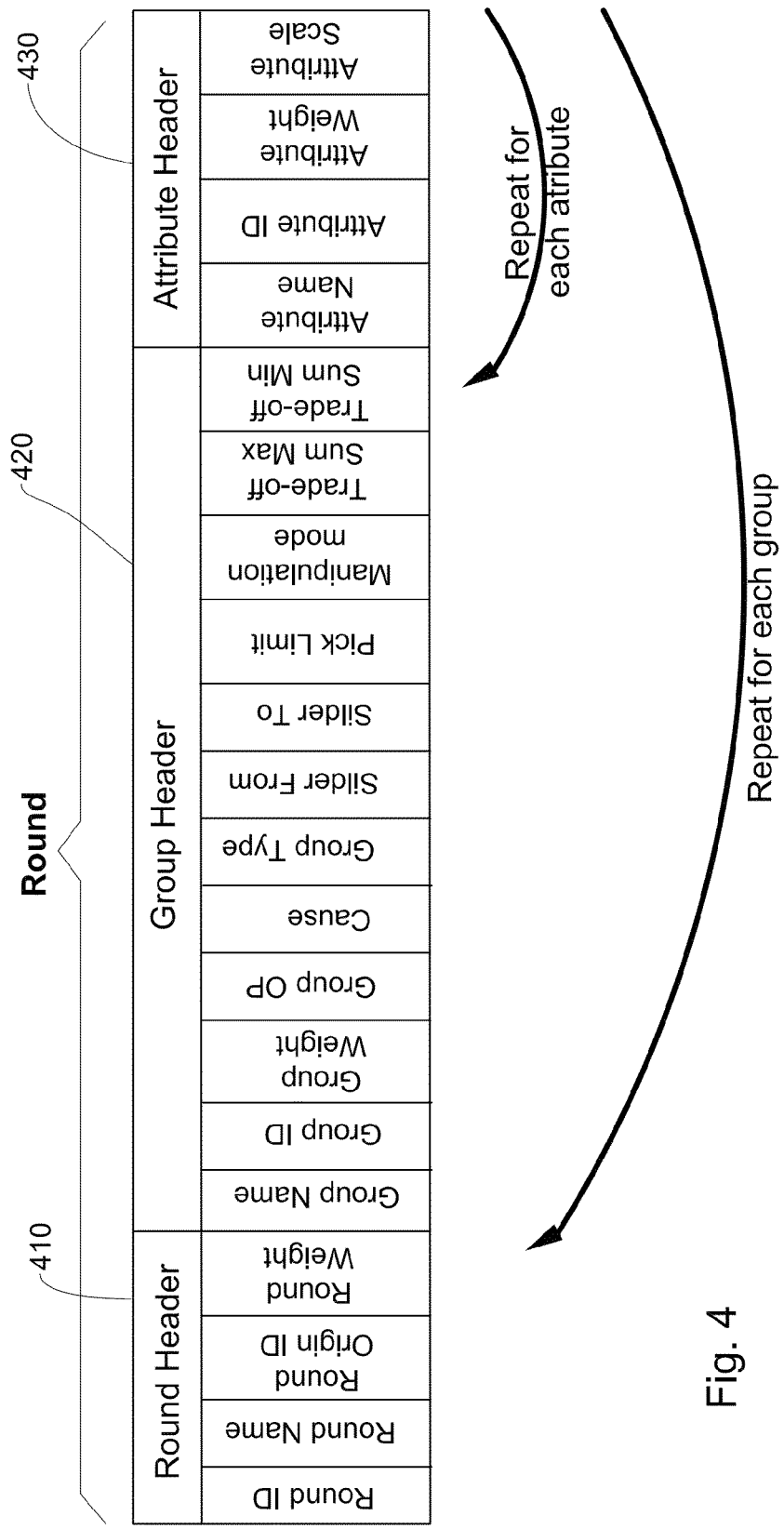
FIG. 4 illustrates a data record structure that represents the data instance of an entity (round) together with its attribute group and attributes in a data repository in accordance with the presently disclosed subject matter.

Attention is now drawn to FIG. 4, illustrating the data record structure that represents the data instance of an entity (round) together with its attribute group and attributes in a data repository in accordance with the presently disclosed subject matter. There are shown three segments of fields in the data record: Round header 410 (representing the entity), Group header 420 (representing the group of attributes) and Attribute header 430 (representing the attributes). Round header 410 includes parameters as follows:

Round ID: ID of the Round; Round Name: name of the Round, which can be the name that is displayed on the GUI;

Round Origin ID: ID of the parent Round in the case of a hierarchy structure. One Round can have more than one Round Origin;

Round Weight: parameter used when comparing and calculating the similarity between two entities.

The second segment of fields is Group header 420 which includes parameters that relate to classified groups within a Round, as follows:

Group ID: ID of the current group; Group Name: name of the group, which can be the name that is displayed on the GUI;

Group Weight: optional parameter used when calculating Weighted Group Score which represents the similarity on a group level between two entities;

Group Operation: logical operation when calculating Group Score in the process of comparing similarity between two entities. Possible values for Group Operation are for instance AND and OR, wherein AND is usually used when a user wishes to define an entity with more than one attribute in a group, and OR is usually used when a user is searching for an entity of interest and only one attribute in the group fits his needs. Group Operation will be discussed in greater detail below with reference to FIG. 12.

Cause: purposes for a user to manipulate the GUI, possible values are Search when the user is searching for an entity of interest, and Define, when the user wants to define an entity on the GUI and store it in a data repository:

Group Type: type of a group depends on how a user manipulates the scales of attributes within a group. Possible values are for instance Slide and Pick:

Slide: a group within which the value of the scales of the attributes is numeric and it requires a user to move sliders to manipulate and balance the scales of the attributes;

Pick: a group within which the value of the scales of the attributes is Boolean and it requires a user to mark certain attributes as picked to define the scales of the attributes; Scale From: the minimum value of the scale of an attribute in a group, only valid when Group Type is set as "Slide";

Scale To: the maximum value of the scale of an attribute in a group, only valid when Group Type is set as "Slide";

Pick Limit: the maximum number of picked attributes within a group, only valid when Group Type is set as "Pick";

Manipulation Mode: the mode in which automatic manipulation of scales of attributes works within a group;

Trade-off Sum Max: the upper threshold of the sum of scales of all attributes in a group, only valid when Manipulation Mode is set as "partial trade-off";

Trade-off Sum Min: the lower threshold of the sum of scales of all attributes in a group, only valid when Manipulation Mode is set as "partial trade-off";

In addition to the above, there is another parameter Trade-off Sum which calculates the sum of scales of all attributes in a group when Manipulation Mode is set as "full trade-off" and "Partial trade-off". Trade-off Sum is usually defined as a variable in the memory, but can also be included in the Group header segment of the data record in a repository as needed.

The third segment of fields is Attribute Header 430 which includes parameters as follows:

Attribute ID: ID of the attribute that belongs to the group above; Attribute Name: name of the attribute, which can be the name that is displayed on the GUI;

Attribute Weight: a parameter used when calculating Attribute Compare Score which represents the similarity on the attribute level between two entities;

Attribute Scale: corresponding to the level of significance of the respective attribute of the entity;

For a certain group, the Attribute Header segment may repeat as many times as the number of attributes within the group. And for each round, the Group Header segment may also repeat as many times as the number of groups within the Round so each group together with its attributes will have corresponding data items within the data record of the entity.

The invention is of course not bound by any of the specified fields and accordingly one or more of the fields may be deleted and/or modified and/or other(s) may be added depending upon the particular application.

The invention is likewise not limited to the specified table such as data record structure and accordingly other known per se data structures may be used, such as matrixes, vectors, arrays, trees or any other known structures that are suitable to implement the present disclosure.

Turning now to FIGS. 5A-5C, there is illustrated a template structure that represents the data schemes of an entity, its attribute groups and attributes in a data repository in accordance with the presently disclosed subject matter. As shown, there is a set of templates in FIG. 5A-5C. The first template in FIG. 5A refers to fields that compose a round which represents an entity or an attribute which is drilled down and associated with its sub-attributes on the round. As can be seen, the first template in FIG. 5A has similar fields of parameters as Round Header segment in FIG. 4. In the illustrated example, the Round Name is "Outdoor Entertainment", and it is an attribute of entity "Entertainment" as shown in Round Origin, and its assigned "Weight" is 100.

The second template in FIG. 5B refers to fields that compose a group which includes a set of attributes that share the same group behavior. Group behavior includes Pick Limit, Manipulation Mode, Trade-off sum max, and Trade-off sum min as introduced above, and it defines the operation and manipulation mode among attributes within a group. As shown, the second template in FIG. 5B has similar fields of parameters as Group Header segment in FIG. 4, except for the fields "Round Name" and "Round Origin" which serve as reference fields to the first template in FIG. 5A. In the illustrated example, the Round Name is "Feature movie", which is a sub-attribute of attribute "Outdoor Entertainment" as shown in "Round Origin". "Feature movie" has one listed group "Genre", and it has been assigned with a "Weight" 10. The "Group Operation" is defined as "OR" which serves as a logical operation when calculating Group Score in the process of comparing the similarity between two entities, as will be explained in greater detail below. The "Cause" is set as "search", indicating that a user is performing a search for an entity of interest. The "Group type" is set as "Slide" instead of "Pick", which means the value of scales of attributes within this group is numeric and it requires a user to move sliders to define and balance the value of the scales, thus the "Pick Limit" field is not applicable. The scale range from 0 (Scale from) to 100 (Scale to). The "Manipulation mode" is Partial trade-off which means that the sum of scales of attributes within the group should be between the "Trade-off sum min" (50 in this case) and "Trade-off sum max" (200 in this case).

The third template in FIG. 5C refers to fields that compose an attribute within a group of an entity. As shown, the third template in FIG. 5C has similar fields of parameters as Attribute Header segment in FIG. 4, except for the fields "Round Name", "Round Origin" and "Round Group" which serve as reference fields to the first template in FIG. 5A and second template in FIG. 5B. In the illustrated example, the Round Name is again "Feature movie", which is a sub-attribute of attribute "Outdoor Entertainment" as shown in "Round Origin". "Feature movie" has one listed group "Genre", and one attribute in this group is "Thriller", which has been assigned with "Weight" 1.

It is to be noted that the template structures in FIGS. 5A-5C can be retrieved for users to use as templates to define an entity or construct their entities of interest to search for, based on the fields defined in the templates. The data record structure in FIG. 4 can also be retrieved from a data repository for users to utilize to define an entity or construct entities of interest. In another case it can also be the specific data instance that the user has defined and constructed for an entity. A data record includes all the fields in the template together with the manipulated scales of attributes of the entity. It will either be stored in the data repository or used as GUI data of interest to search and compare with.

The invention is of course not bound by any of the specified fields and accordingly one or more of the fields may be deleted and/or modified and/or other(s) may be added depending upon the particular application.

The invention is likewise not limited to the specified table like data record structure and accordingly other known per se data structures may be used, such as matrixes, vectors, arrays, trees or any other known structures that are suitable to implement the present disclosure. The utilization of the various fields of the templates depicted in FIG. 5A-5C in the search and compare operations will be exemplified below.

Having described the graphical display as well as data structures that represent an entity, its associated attributes and attribute groups in accordance with certain embodiments, a sequence of operations for constructing and manipulating a GUI are now described with reference to FIG. 6 in accordance with the presently disclosed subject matter.

First, Step 610 is performed by retrieving from a data repository first GUI data representing at least (i) an entity, (ii) attributes of an entity, (iii) a manipulatable scale associated with a respective attribute and signifying a level of significance of the attribute. As explained above, in one embodiment, first GUI data herein may refer to data schemes such as templates in FIGS. 5A-5C that represent the properties of the entity, and a user can use these templates to define his/her entity of interest. By this example the scale that is associated with a respective attribute is usually set by its default value and is manipulatable by a user to indicate his/her preference of significance of the attribute. In this case step 610 should be performed as retrieving from a data repository first GUI data representing at least one set of templates that include at least attribute data and manipulatable scale data. Each set of templates represents an entity. The attribute data associated with the entity represent attributes of the entity. Each manipulatable scale data represent a manipulatable scale associated with a respective attribute and signify a level of significance of the attribute.

In another embodiment, first GUI data may refer to data instances that are already defined and stored in a data repository, such as data records described in FIG. 4. In this case the data records include at least attribute data and scale data, as introduced in the Attribute Header segment of data record structure in FIG. 4. Step 610 should be performed as retrieving from a data repository first GUI data representing at least one data record that includes at least attribute data and scale data. Each data record represents an entity. The attribute data associated with the entity represent attributes of the entity and each scale data represents a scale associated with a respective attribute and signifies a level of significance of the attribute. In both cases, if the attributes of the entity are classified into a number of groups within which there are manipulation modes that determine the automatic manipulation among the attributes, the first GUI data will further represent (iv) group behavior which includes manipulation modes.

Second, Step 620 is performed as: constructing on a screen the GUI including converting the first GUI data into displayable GUI data which include at least the entity, its attributes and for at least one of the attributes a manipulatable scale and displaying the displayable GUI data. The GUI referred to in step 620 may be constructed for instance in the GUI module 110 in FIG. 1. Converting from the first GUI data to the displayable GUI data is executed by the Conversion module 130 in FIG. 1. The displayable GUI data refer to the graphical elements on the GUI (e.g. the round shape representing entity as well as the graphic representations of the attributes and scales depicted for instance in FIG. 2) which represent the entity and its attributes with their respective scales.

Next, step 630 enables a user to perform on the GUI a manipulation of at least one manipulatable scale of a respective attribute giving rise to manipulated displayable GUI data. In one embodiment the user's manipulation may trigger an automatic manipulation of at least one other scale of another attribute, which is defined by a manipulation mode within a group, as explained in greater detail with reference to FIGS. 2B-2D.

Next, step 640 converts the manipulated displayable GUI data into second GUI data representing at least one data record that includes attribute data corresponding to the attributes and scale data corresponding to scales associated with respective attributes. The converting from the displayable GUI data to the second GUI data is executed for instance by the Conversion module 130 in FIG. 1. In case in step 610 the first GUI data are retrieved as data records that include at least attribute data and scale data, step 640 should be performed accordingly as converting at least the manipulated scales of the manipulated displayable GUI data into second GUI data representing a portion of a data record that includes scale data corresponding to the manipulated scales, wherein the data record includes attribute data corresponding to the attributes and scale data corresponding to scales associated with respective attributes, since in this case there is only a need to convert the portion that has been changed, which is the manipulated portion of the displayable GUI data. The following step 650 uses at least one data record that is converted from the manipulated displayable GUI data for operations in the data repository. In case in step 610 the first GUI data are retrieved as data records that include at least attribute data and scale data, step 650 should be performed accordingly as using at least a portion of the data record for operations in the data repository. In accordance with certain embodiments, at least one of the operations in the data repository in step 650 is selected from a group comprising storing at least one data record or portion thereof in the data repository; and searching the data repository for data matching at least one data record or portion thereof.

It is to be noted that the present disclosure is not bound by the specific sequence of operation steps described above with reference to FIG. 6.

In accordance with one embodiment, at least one of the attributes of an entity in step 610 is a rating attribute for users to express their satisfaction and feedback with regard to the entity. The rating process of the entity is performed in the same way as the method described with reference to FIG. 6. Different rating attributes may be defined according to different entities, for instance the entities might be feature movies, hotels or restaurants, and their associated rating attributes will change accordingly. For example, the rating attributes can be defined as "interesting", "boring", "worth watching" when the entity is a feature movie, and accordingly for an entity of restaurant there might be rating attributes such as "service", "quality of food" etc. Since the rating of an entity is a satisfaction survey of the content or the service of the entity, it requires more than one user to perform the rating process according to step 610-650 in FIG. 6, and in the end, the process will further include one more step: calculating the overall rating of the entity by aggregating rating scales of the rating attributes of at least one user. It is to be noted that different users can be assigned different weights according to their seniority or importance, and the weights will affect the aggregation of rating scales of different users.

In accordance with another embodiment, the rating of an entity can be performed by using exactly the same attributes that define the entity, instead of using specific rating attributes. For example, when a user defines an entity of "entertainment", he/she may use attributes such as "outdoor entertainment" and "indoor entertainment" to categorize it. For "outdoor entertainment", there may be sub-attributes such as "feature movie" and "restaurant". Furthermore under "feature movie" there are sub-attributes such as "drama", "comedy" or "thriller". After the user watched a drama movie, he/she may go back to the same rounds "entertainment", "outdoor entertainment" and "feature movie" to define how he evaluates this movie with regard to the same attributes. This type of rating can also be performed in the same way as the method described with reference to FIG. 6, together with the aggregation step in the end of the process, and the rating score reflects how accurate the entity's definition of itself is to the public.

It is to be noted that there may be a number of alternative embodiments of the rating process. For example, there is one dimensional rating which gives an entity one rating score within a range, for example, a user can give a certain movie a rating of 8.3 out of 10. And the different rating processes might have an effect on the overall find-ability of the rated entity. This can be achieved for example by utilizing the rating score as an attribute of the entity, which will be weighted and aggregated together with other attributes during the search and comparison, and thus influence the searching results, as will be shown with reference to FIGS. 13A-13C.

In accordance with yet another embodiment, the attributes of an entity in step 610 can be expression and emotion attributes for users to express their feelings and opinions in regard to the entity. The entity can be any content on the Internet, for instance a post on Facebook, an article of a newspaper, or any other suitable subject matter on which users can express their emotions and expressions. Users can express their opinions and feelings such as funny, sad, exciting, boring, annoying, inspiring, empathic and disappointing, as well as to the extent of each expression. The emotion expressing process of the entity is performed in the same way as the method described with reference to FIG. 6, as will be readily appreciated by those versed in the art.

In accordance with yet another embodiment, the entity and its attributes can be utilized to request and provide information. For example the entity can be a question or a request such as "How do you feel today?", and the attributes of the entity will be different options of answers such as happy, relaxed, love, excited, confused, angry, sad etc. After the user chooses an answer, such as "happy", he will be given another question or request such as "why do you feel this way today?" or "describe your day" on another round, and the attributes of the new round will be another set of answers such as health, job, family, financial, relations, entertainment, sports etc. The requesting and providing information process is performed in the same way as the method described with reference to FIG. 6, as will be readily appreciated by those versed in the art.

For a better understanding of the foregoing, the sequence of operations described with reference to FIG. 6 will be exemplified with reference to the GUI depicted in FIG. 2A.

In compliance with step 610 in FIG. 6, first GUI data are retrieved from a data repository representing at least (i) an entity, (ii) attributes of an entity, and (iii) a manipulatable scale associated with a respective attribute and signifying a level of significance of the attribute. In accordance with one embodiment, first GUI data may refer to data records that are already defined and stored in the data repository, or a set of templates, as explained in detail in step 610.

Next, in compliance with step 620 a GUI is constructed on a screen including converting the first GUI data into displayable GUI data which include at least the entity, its attributes and for at least one of the attributes a manipulatable scale and displaying the displayable GUI data including depicting the entity as a predefined shape and the attributes on the predefined shape and the manipulatable scale as sliders extending substantially from the center of the shape towards the periphery of the shape wherein the sliders comprise respective indicators indicative of the manipulatable scales that correspond to the significance of the respective attributes of the entity, and enabling a user to perform on the GUI a manipulation of at least one manipulatable scale of the respective attribute by moving the indicators along the sliders, giving rise to manipulated displayable GUI data. The graphical elements that are included in this step such as the shape, sliders and indicators are explained in greater detail with reference to FIG. 2A.

Next, similar to step 640 and 650 in FIG. 6, the manipulated displayable GUI data are converted into second GUI data representing at least one data record that includes attribute data corresponding to the attributes and scale data corresponding to scales associated with respective attributes, and the at least one data record or portion thereof is used for operations in the data repository. In accordance with certain embodiments, at least one of the operations in the data repository is selected from a group comprising storing at least one data record or portion thereof in the data repository; and searching the data repository for data matching at least one data record or portion thereof. In accordance with another embodiment, first GUI data may refer to data records that are already defined and stored in the data repository, and the present converting and using data record for operations steps will accordingly change as explained in detail in steps 640 and 650.

In accordance with another embodiment, the attributes are hierarchical and can be drilled down to sub-attributes associated with their respective scales, as introduced above with reference to FIG. 3A. In this case, the attributes of the entity can further be displayed with respective shapes of their own characterized by sub-attributes of the attributes and scales of the sub-attributes, thereby forming layers of shapes to represent the entity.

Attention is now directed to FIG. 7 illustrating a flowchart of a sequence of operations for searching through a GUI an entity of interest that includes a plurality of attributes, in accordance with the presently disclosed subject matter. The entity of interest herein refers to the target entity that a user is interested to search for.

As shown, in step 710 GUI data are retrieved from a data repository representing at least (i) an entity, (ii) attributes of an entity, and (iii) a manipulatable scale associated with a respective attribute and signifying a level of significance of the attribute. Step 710 is performed in a similar way to step 610 in FIG. 6.

As mentioned before, in accordance with certain embodiment, GUI data may refer to data instances that are already defined and stored in the data repository, such as data records in FIG. 4, or data schemes such as a set of templates described in FIGS. 5A-5C, as explained in step 610.

In step 720, a GUI is constructed on a screen including converting the GUI data into displayable GUI data which include at least the entity, its attributes and for at least one of the attributes a manipulatable scale and displaying the displayable GUI data. Step 720 is performed in a similar way to step 620 in FIG. 6.

Step 730 enables a user to perform on the GUI a manipulation of at least one manipulatable scale of a respective attribute, giving rise to a search query representing the entity of interest, its associated attributes and scales associated with respective attributes with their respective scales. The search query herein represents the search terms and keywords which identify features of the entity of interest as attributes, and the significance of each term and keyword as a respective scale associated with each attribute in a graphical way.

Next, step 740 converts the search query into GUI data of interest representing at least one data record of interest that includes attribute data corresponding to the attributes and scale data corresponding to scales associated with respective attributes. Step 740 is performed in a similar way to step 640 in FIG. 6.

In case in step 710 the GUI data are retrieved as data records that include at least attribute data and scale data, step 740 is performed accordingly as converting at least the manipulated scales of the search query into GUI data of interest representing a portion of a data record of interest that includes scale data corresponding to the manipulated scales, wherein the data record of interest includes attribute data corresponding to the attributes and scale data corresponding to the scales. The data record of interest that represents the search query in the data repository will be explained in greater detail, with reference to FIG. 8.

In step 750 and step 760 searching is performed in the data repository for at least one candidate data record which includes at least attribute data and scale data that matches the data record of interest, including comparing similarity of the attribute data and scale data of the data record of interest with corresponding attribute data and scale data of the candidate data record, giving rise to a first comparison indication, and providing similarity indication based on at least the first comparison indication. (Note, incidentally, that in accordance with certain embodiments that will be described below, reference is made also to a second comparison indication.) The searching in this step is executed e.g. by the search module 140 in FIG. 1. The comparison is executed e.g. by the comparison module 150 in FIG. 1. It is to be noted that the searching can be realized with any known search engine technology that is suitable to perform the searching and retrieve search results as candidate data records, for instance U.S. Pat. No. 8,055,669 whose content is incorporated herein by reference. The comparison between the data record of interest and candidate data record will be explained in greater detail below, with reference to FIG. 12. The candidate data record that represents a candidate entity in the data repository will be explained in greater detail, with reference to FIG. 11.

In accordance with one embodiment, at least one candidate data record will be classified as a respective resulting data record only if the similarity indication meets a given criterion, as shown in condition step 770. Here the similarity indication may refer to a matching score as to what extent the data record of interest and the candidate data record match each other. For example, the given criterion can be set as 80%, so the candidate data record will only be classified as a resulting data record if the matching score is no less than 80%. Note that the similarity indication will be discussed and exemplified in greater detail below, with reference to FIGS. 13A-13C.

In step 780, if not all the candidate data records from the search results are compared with the data record of interest, the comparison in step 760 will be repeated until all candidate records are compared.

Step 790 further converts each one of the resulting data records that meets the similarity indication criterion and its associated attribute data with their respective scale data into a corresponding resulting displayable GUI data and displaying the resulting displayable GUI data on the GUI of the screen. In one embodiment, the resulting data records can also be displayed as a search result list to the user without being converted into resulting displayable GUI data, or in any other desired manner.

In accordance with a certain embodiment, the attributes of an entity are hierarchical and can be drilled down to sub-attributes associated with their respective scales as mentioned with reference to FIGS. 3A and 3B. The drilling down can be performed repeatedly on the sub-attributes. In this case not only the attributes and associated scales need to be compared, but also at least some of the sub-attributes and their associated scales. Accordingly step 750 in FIG. 7 will further include searching in the data repository for at least one candidate data record including at least attribute data and scale data that matches the data record of interest, including comparing similarity of the attribute data associated with their respective scale data, and the sub-attribute data associated with their respective scale data of the data record of interest with corresponding attribute data associated with their respective scale data, and the sub-attribute data associated with their respective scale data of the candidate data record, giving rise to a first comparison indication, and providing similarity indication based on at least the first comparison indication. Note that the similarity indication will be discussed and exemplified in greater detail below, with reference to FIGS. 13A-13C.

It is to be noted that the present disclosure is not bound by the specific sequence of operation steps described above with reference to FIG. 7.

Figure 8:
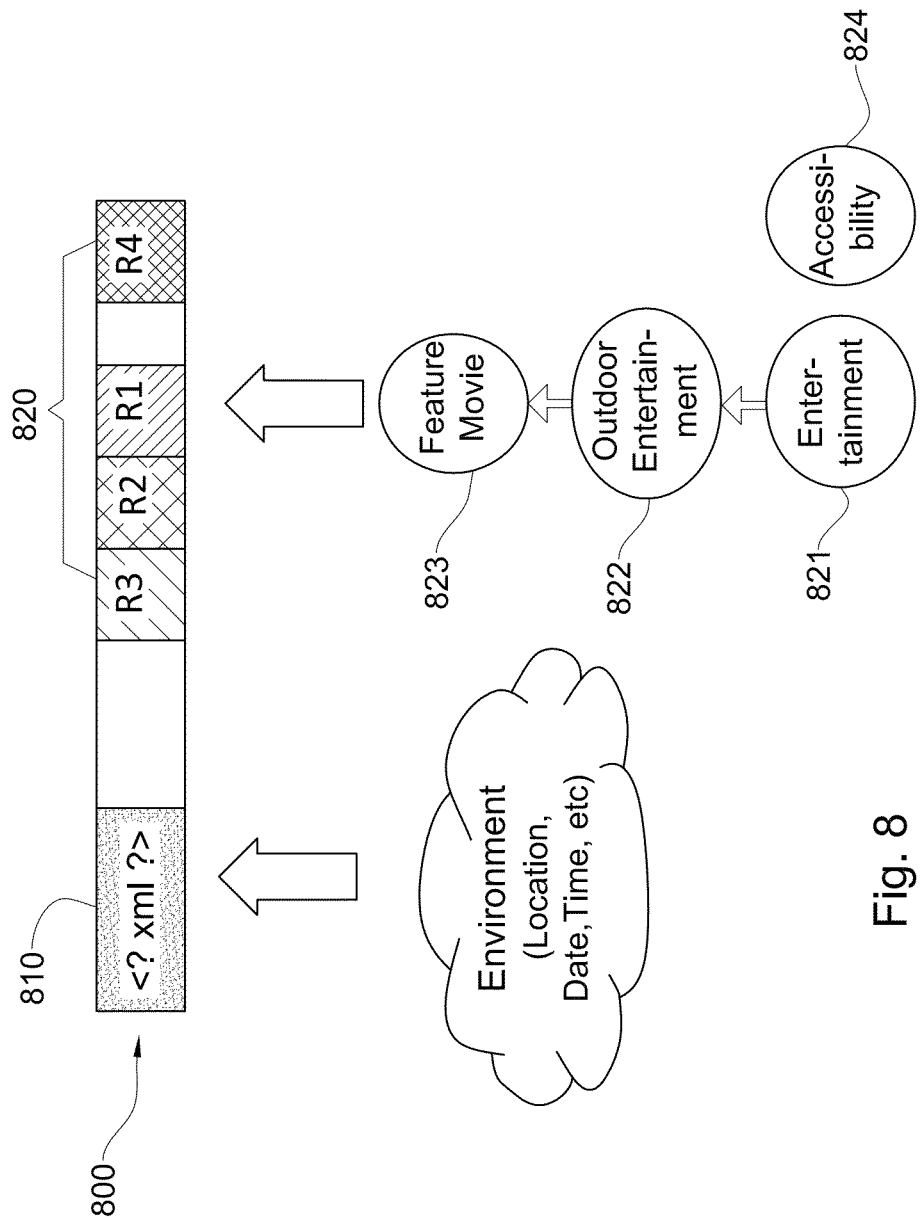
FIG. 8 illustrates a data record of interest that represents a search query in the data repository in accordance with the presently disclosed subject matter.

Turning now to FIG. 8, there is shown a data record of interest that represents a search query in the data repository in accordance with the presently disclosed subject matter. As seen, the data record of interest 800 includes two portions: metadata 810 and a series of Rounds 820. Metadata 810 at the prefix of the data record represents the general information of the environment for the entity of interest that a user is searching for, such as the location, date and time etc. Metadata can be stored for example as XML format in the data repository. Rounds 820 include a number of data records representing rounds of an entity, its attributes and drilled down sub-attributes, as shown as R1, R2 etc, each of which is composed as a data structure that is described for example with reference to FIG. 4. Thus each round in Rounds 820 includes data indicative of an entity or an attribute, its groups, attributes or sub-attributes and scales. As shown in the illustrated example, suppose that a user is searching for a drama movie outdoors. The user will start to specify his/her search query from the main Round 821 which represents entity "Entertainment". The user selects the attribute "Outdoor Entertainment" of entity "Entertainment" and since the selected attribute has sub-attributes, the selected attribute is drilled down to a sub-round 822 with its own sub-attributes including "Feature Movie" (namely "Feature Movie" being a sub-attribute of "Outdoor Entertainment"). The user again selects sub-attribute "Feature Movie" which is further drilled down to another layer of sub-round 823 with its sub-attributes among which there is the needed category "Drama movie" (namely "Drama movie" being a sub-attribute of "Feature Movie" which in turn is a sub-attribute of "Outdoor Entertainment").

With reference to FIG. 3A for illustrative purposes, round 310 would be the main round for entity "Entertainment", and round 320 would be a sub round for attribute "Outdoor Entertainment", and round 330 would be another layer of sub round for sub-attribute "Feature movie". After the user finishes his/her selections, Rounds 821, 822 and 823 are stored in the data record of interest 800 which concatenates R1, R2 and R3 as illustrated in FIG. 8. In case the user also wishes to include another attribute "accessibility" in the search query, since he may wish to know the accessibility of a certain theater that has this movie, but does not find this attribute in any round of 821-823, he/she may have the option to start a separate round which defines the attribute "accessibility", as shown in Round 824. Round 824 is stored in the same data record of interest 800 as R4, together with R1-R3. Thus the metadata 810 and Rounds 821-824 together compose the data record of interest 800 which represents the user's search query.

In accordance with a certain embodiment, the search query can further include user profile information in order to get better customized searching results that match the user's preferences. In this case the GUI data in step 710 in FIG. 7 further represent at least (i) an entity of a user, (ii) profile attributes of said user, and (iii) a manipulatable profile scale associated with a respective profile attribute and signifying a level of significance of the profile attribute. Step 730 further includes enabling a user to perform on the GUI a manipulation of at least one profile scale of a respective profile attribute, and the search query further represents the entity of the user and its associated profile attributes with their respective profile scales. Accordingly the GUI data of interest representing at least one data record of interest in step 740 further includes profile attribute data corresponding to the profile attributes and profile scale data corresponding to the profile scales. And the searching in step 750 further includes comparing the profile attribute data and profile scale data of the user with corresponding attribute data and scale data of the candidate data record, giving rise to a second comparison indication, and providing the similarity indication based on at least the first and second comparison indication.

Figure 9:
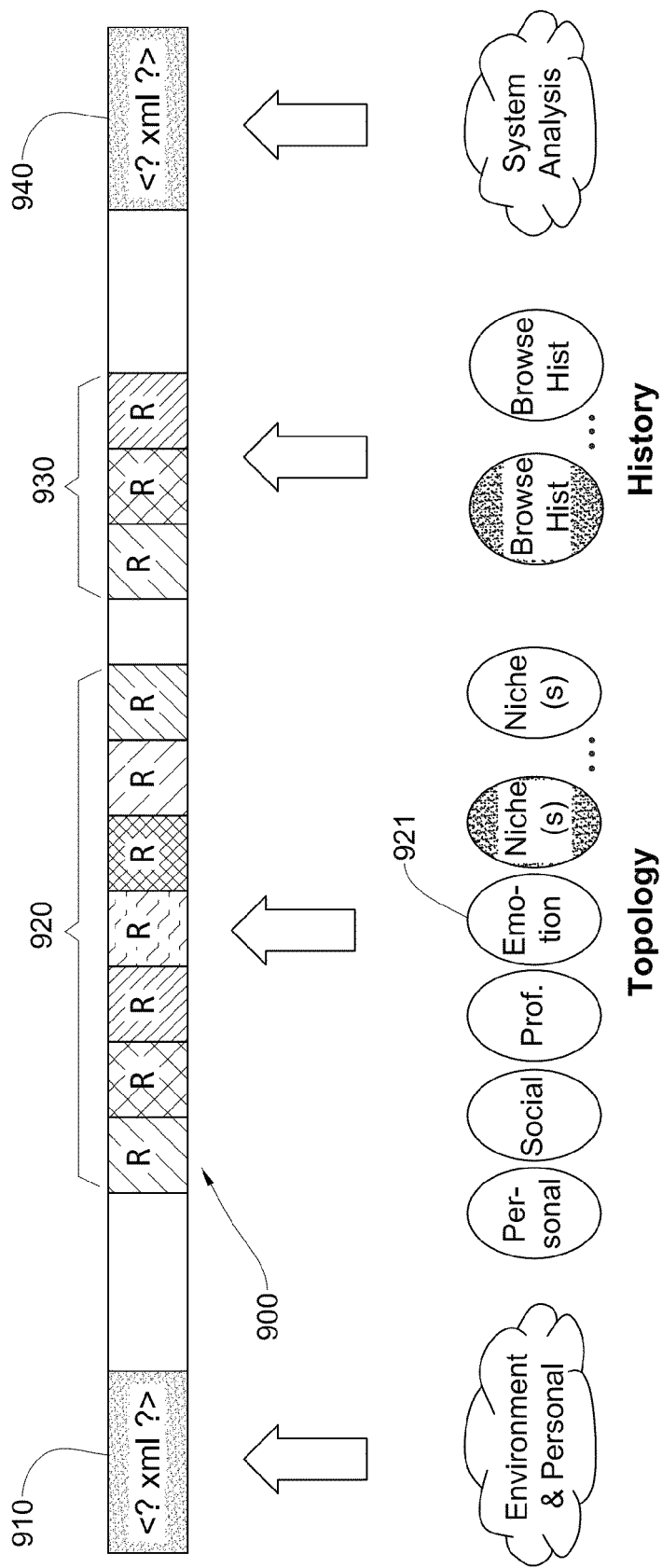
FIG. 9 illustrates a data record that represents a user's profile in a data repository in accordance with the presently disclosed subject matter.

Turning now to FIG. 9, there is shown a data record that represents a user's profile in a data repository in accordance with the presently disclosed subject matter. As shown, the data record 900 includes mainly four portions: metadata 910, Rounds of typology 920, Rounds of history 930 and system analysis 940. Metadata 910 at the prefix of the data record represents the general information of the user that conducts the search, including the environment data such as location, languages, and personal data such as age, gender, marital status etc. Metadata can be stored for example as XML format in the data repository. Rounds of typology 920 include a number of data records as introduced above with reference to FIG. 4, representing, respectively, rounds of the personal, social, professional, emotional and niche typologies of the user. The user can manipulate the profile scales of profile attributes on each round to define his/her personality and personal interests. Among the rounds in 920, there is shown a Round 921 which is the Round of emotion. As have explained above with reference to FIG. 6, the attributes of an entity can be expression and emotion attributes for users to express their feelings and opinions with regard to the entity. The entity can be any content on the Internet, for instance a post on Facebook, an article of a newspaper, or any other suitable subject matter on which users can express their emotions and expressions. Here round 921 is constructed in the same way where users can express their emotions such as funny, sad, exciting, boring, annoying, inspiring, empathic and disappointing about an entity of interest or themselves.

Rounds of history 930 include a number of data records of rounds which are aggregated based on the browse, search and rating history of this user representing the user's desires, likes and dislikes. The suffix portion of data record 900 being system analysis 940 stores the information about the user's preferences that is analyzed based on the user's typology and browse histories. By way of examples, the system analysis may decide that a certain user is e.g. adventurous, or other types, by comparing the profile scales of the profile attributes of the user's Rounds of typology with certain pre-stored information such as a given matching criteria of certain typologies in a data repository.

Figure 10:
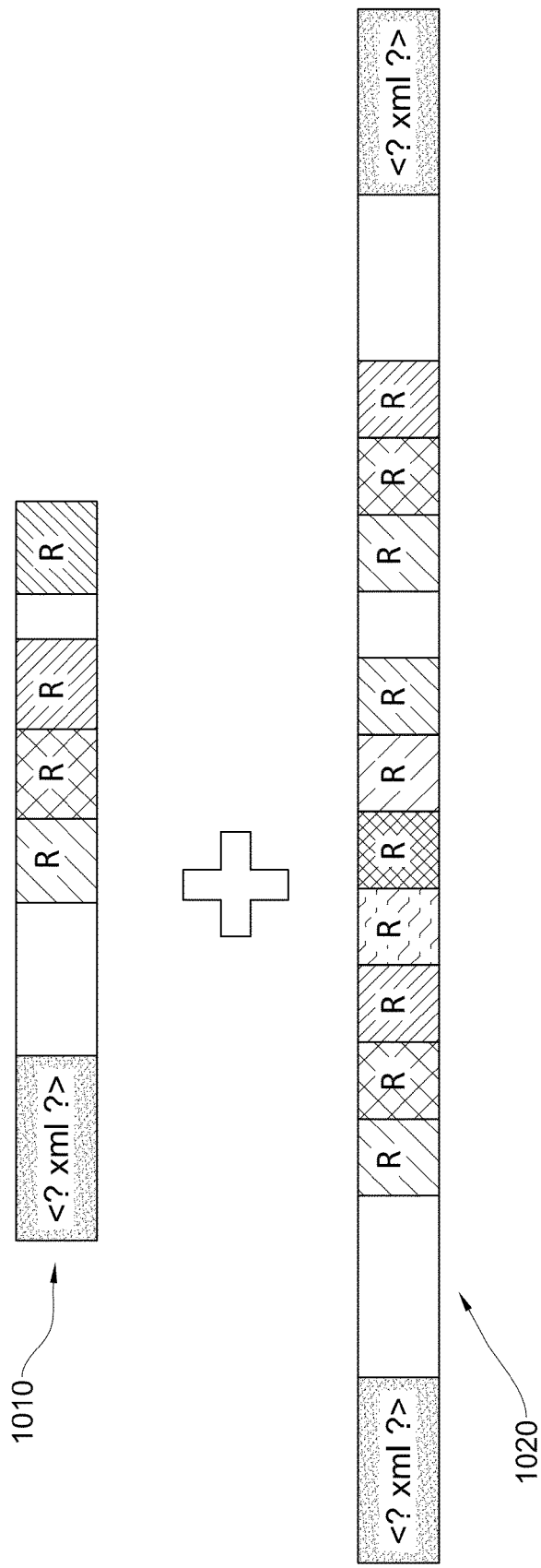
FIG. 10 illustrates a combined search query that further includes user profile information, in accordance with the presently disclosed subject matter.

Turning now to FIG. 10, there is shown a combined search query that further includes user profile information, in accordance with the presently disclosed subject matter. 1010 is the data record of interest that represents the original search query that represents the entity of interest, without user profile information, as illustrated with reference to FIG. 8. And 1020 is the data record that represents a user's profile as illustrated with reference to FIG. 9. The combined search query will include both data records 1010 and 1020 as explained in step 730, in order to get more customized searching results that match the user's preferences. The manner of combining the search records is generally known per se.

Figure 11:
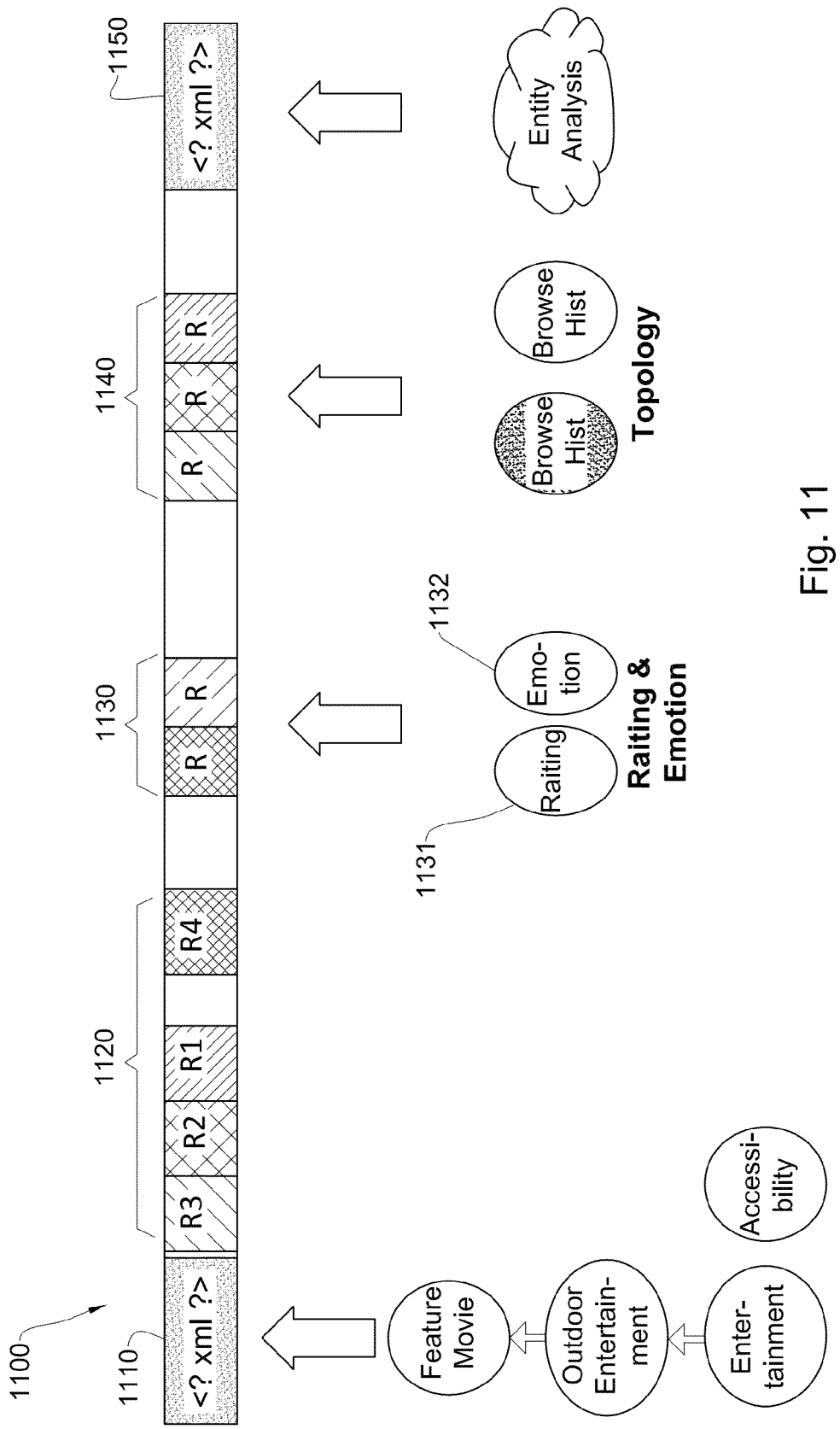
FIG. 11 illustrates a candidate data record representing a candidate entity in the data repository in accordance with the presently disclosed subject matter.

Attention is now directed to FIG. 11, illustrating a candidate data record representing a candidate entity in the data repository in accordance with the presently disclosed subject matter. A candidate entity refers to a prospective entity that may match a given search query. As shown, the data record 1100 includes the following portions: metadata 1110, Rounds 1120 representing the candidate entity, its attributes and drilled down sub-attributes, Rounds of rating and emotion 1130, Rounds of typology 1140 and entity analysis 1150. Metadata 1110 and Rounds 1120 are similar to the corresponding portions 810 and 820 with reference to FIG. 8. Metadata 1110 represents the general information of the environment for the candidate entity. Rounds 1120 include a number of data records representing rounds of an entity, its attributes and drilled down sub-attributes, as shown as R1, R2 etc, each of which is composed as a data structure that is described for example with reference to FIG. 4. Rounds of rating and emotion 1130 comprise Round of rating 1131, wherein there are rating attributes for users to express their satisfaction and feedback with regard to the candidate entity, and Round of emotion 1132, wherein users can express their emotions such as funny, sad, exciting, boring, annoying, inspiring, empathic and disappointing about the candidate entity. Rounds of typology 1140 include classification of the candidate entity based on the browse history of this entity, for example, "Feature movie" can be classified according to the cast typology, user's personality typology etc. Entity analysis 1150 in the suffix portion stores additional information such as marketing and sales or any other information that can be extracted from the attributes of the entity or previous search history.

It is to be noted that the data record structures with reference to FIGS. 8-11 are merely illustrated examples in accordance with a certain embodiment to implement the present disclosure, and should not be construed as limiting the present disclosure in any way. Additional portions and fields may be applied in addition to or instead of the above. Those versed in the art will readily appreciate that data record structure details can be organized differently in alternative ways that are suitable to implement present disclosure.

Moreover, the specific content of the search queries and the data records is provided for illustrative purposes only and is by no means binding.

Turning now to FIG. 12, there is shown a flowchart of the comparison sequence of operations between an entity of interest and a candidate entity in accordance with the presently disclosed subject matter, as briefly introduced in step 760 with reference to FIG. 7.

As shown, in step 1210, data records are retrieved from a data repository representing the entity of interest and the candidate entity. The data records include at least attribute data, scale data and group operation data, wherein attribute data represent attributes of the entities and scale data represent scales associated with respective attributes signifying levels of significance of respective attributes. The attributes are classified into groups, within which there are different group operations AND or OR being represented by the group operation data. The attributes associated with the scales form predetermined shapes such as a round on a Graphic User Interface (GUI) representing the entity of interest and the candidate entity.

Step 1220 compares scale data associated with each attribute of the entity of interest with scale data associated with the same attribute of the candidate entity, selecting the smaller scale data of the comparison as Attribute Compare Score for each attribute. Here Attribute Compare Score is defined for example as a variable to store the comparison result in the attribute level.

Next, in step 1230 Group score is calculated, wherein Group Score is defined for example as a variable to store the comparison result in the group level. The value of group operation data is set either as AND or OR, as introduced with reference to FIG. 4. If the group operation data of the group that the compared attributes belong to is set to OR, step 1230 will calculate the ratio of the largest Attribute Compare Score within the group to the maximum scale of attributes of the same group and set the ratio as Group Score. Otherwise the group operation data is set to AND and step 1230 will calculate the ratio of the sum of Attribute Compare Scores to the sum of the scale data associated with the attributes of the entity of interest and set the ratio as Group Score. Step 1230 further includes calculating all the Group Scores in the same manner.

Step 1240 then sums up all Group Scores as Shape Match Score, representing the similarity indication between the entity of interest and the candidate entity. Shape Match Score is defined for example as a variable to store the comparison result in the shape level.

Having described the comparison algorithm between the entity of interest and the candidate entity wherein both entities are associated with only one shape, there is now shown the comparison algorithm wherein the attributes of both entities are hierarchical and are drilled down to a further layer of shapes.

In this case, step 1210 will be applied to a situation where the attributes are hierarchical and can further be associated with respective shapes of their own characterized by sub-attributes of the attributes and scales of the sub-attributes, thereby forming layers of shapes to represent the entity of interest and the candidate entity. The attributes, groups and shapes are assigned with different weights.

Step 1220 performs the same procedures to obtain Attributes Compare score but starts from the sub-attributes of the most outer layer of the shapes. Since the drilling-down of the shapes extends from the center outwards, the most outer layer of the shapes refers to the leaf shapes in the hierarchical structure. Step 1220 includes: from the most outer layer of the shapes, calculating the ratio of each sub-attribute weight to the sum of all sub-attribute weights within a respective group, applying the ratio of each sub-attribute weight to the scale data of the respective sub-attribute and comparing the weighted scale data of each sub-attribute of the entity of interest to the weighted scale data of the same sub-attribute of the candidate entity, selecting the smaller scale data of the comparison as Attribute Compare Score for each sub-attribute.

Step 1230 performs the same procedures to obtain Group score and includes: if group operation of the group that the compared sub-attributes belong to is set to OR, calculating the ratio of the largest Attribute Compare Score within the group to the maximum scale of sub-attributes of the group, setting the ratio as Group Score; otherwise the group operation is set to AND, calculating the ratio of the sum of Attribute Compare Scores to the sum of the scale data of the sub-attributes of the entity of interest, setting the ratio as Group Score, calculating all Group Scores; calculating the ratio of each group weight to the sum of all group weights, applying the ratio of each group weight to the respective Group Score to obtain Weighted Group Score.

Step 1240 further includes: calculating all Shape Match Scores for shapes in the most outer layer that are drilled down from the same inner shape, calculating Shape Match Score for the inner shape, calculating the ratio of each shape weight to the sum of all shape weights in the most outer layer together with the inner shape weight, applying the ratio of each shape weight to the respective Shape Match Score to obtain the Weighted Shape Match Score for the inner shape, and calculating Weighted Shape Match Scores for all the inner shapes.

One more step 1250 follows step 1240 including repeating step 1240 until the Weighted Shape Match Score of the most inner shape is obtained, which represents the similarity indication between the entity of interest and the candidate entity.

One example of the search and comparison is illustrated now, with reference to FIGS. 13A-13C, in accordance with the presently disclosed subject matter. As shown in columns 1311-1323 in table 1310 in FIG. 13A, "Rd. Name", "Rd. Origin", "Rd. Group", "Att. Name", "Att. W.", "Att. Scale 1", "Att. Scale 2", "Att. Comp. Score", "Gr. Score", "W. Gr. Score", "S. Match Score", "W. S. Match Score 1", "W. S. Match Score 2" are short forms respectively for "Round Name", "Round Origin", "Round Group", "Attribute Name", "Attribute Weight", "Attribute Scale 1", "Attribute Scale 2", "Attribute Compare Score", "Group Score", "Weighted Group Score", "Shape Match Score", "Weighted Shape Match Score 1 for inner layer" and "Weighted Shape Match Score 2 for next layer".

In table 1310 in FIG. 13A, there is shown data indicative of rounds, groups and attributes for the purpose of illustration of the comparison procedures between the entity of interest and a candidate entity in the data repository. In FIGS. 13B and 13C there are shown features of the rounds and groups, as well as group behaviors that define the operation and manipulation mode among attributes within a group. As shown in the column "Att. Scale 1" which represents the attribute scales for entity of interest in table 1310, there is illustrated a situation that a user is searching for an "Outdoor Ent." (referring to "Outdoor Entertainment") such as a romance or drama movie. The user defines the entity of interest on the Round of "Ent." (referring to "Entertainment"), wherein there are two groups of attributes "Type" and "Companion". The user is asked to balance between attributes "Outdoor Ent." and "Indoor Ent." (referring to "Indoor Entertainment") in group "Type", and to balance among attributes "Single", "Couple", "Friends" and "Family" in group "Companion" as illustrated in step 730 in FIG. 7. The user is mostly interested in going out but is also willing to consider indoor activities if such will match his requirements, so he chooses scales 80 for "Outdoor Ent." and 20 for "Indoor Ent.", according to the manipulation mode of group "Type" which is defined as full trade-off as shown in FIG. 13C and the sum of scales in this group which is read from memory as 100. Similarly he also picks "Family" in group "Companion" in which the manipulation mode is set as Pick and the Pick limit is set as 1 in the case that the Cause is Search as shown in FIG. 13C. Next, the user clicks on "Outdoor Ent." and this attribute is further drilled down to "Feature movie", "Restaurant", "Show", "Theater" and "Bar" to better understand the user's needs. As shown in FIG. 13C, the manipulation mode of this group "Type" that includes "Feature movie", "Restaurant", "Show", "Theater" and "Bar" is set as partial trade-off and the trade-off sum min is 100. The user chooses scale 100 for "Feature movie" and he is also willing to consider a restaurant as he chooses 50 for this sub-attribute. Assume that the user further drills down "Feature movie" into three groups "Genre", "Location" and "Rating" with respective sub-attributes, and he specifies that he is interested in a thriller to some extent (scale 50) but a romance movie, drama or comedy will fit better (scale 90 for each sub-attributes). He also specifies that the location needs to be city 1, city 3 or city 4, and he would prefer a movie with good rating (scale 90). The sub-attribute "Rating" here refers to a one dimensional rating which gives "Feature movie" a rating score within a range, as described above with reference to FIG. 6. The "Rating" score is utilized as an attribute which will be weighted and aggregated together with other attributes during the comparison, thus influencing the searching results. The scales of these sub-attributes are balanced similarly according to the group behavior defined in FIG. 13C.

Attention is now directed to the column "Att. Scale 2" which represents the attribute scales for candidate entity in table 1310. There is a candidate entity stored in the data repository that is described as an outdoor romantic drama that is suitable for singles, couples and the whole family, and it is played in city 3 with a rating of 75.

Now that all the attribute data, scale data and group behavior data are obtained as described in step 1210 in FIG. 12, the comparison between the entity of interest and the candidate entity according to FIG. 12 is described as follows:

i) from the most outer layer of rounds, calculate the Attribute Compare Score as illustrated in step 1220 in FIG. 12. In this case "Feature movie" is the leaf round with sub-attributes. Since all the attribute and sub-attribute weights are assigned as 1, there is no need to apply the weights on attribute scales. Compare the scales of each sub-attribute of the entity of interest and the candidate entity, and select the smaller scale as the Attribute Compare Score. As shown in the column of "Att. Comp. Score" in table 1310, in group "Genre", the "Romantic" and "Drama" have Attribute Compare Scores as 90 and the rest have scores as 0. Similarly the Attribute Compare Score for each attribute in group "Location" and "Rating" can also be obtained as shown in table 1310;

ii) calculate Group Scores as described in step 1230 in FIG. 12. As shown in FIG. 13C, the group operation in group "Genre" is defined as OR. Calculate the ratio of the largest Attribute Compare Score (90) within this group to the maximum scale of sub-attributes (100) of this group, setting the ratio as Group Score (90%). Similarly the Group Score for group "Location" and "Rating" can also be obtained as 100% and 83%, as shown in the column of "Gr. Score" in table 1310;

The group weights for "Genre", "Location" and "Rating" are respectively 10, 20 and 15 as shown in FIG. 13C. Apply group weights on the calculated Group Scores and obtain Weighted Group Scores as 20%, 44% and 28%.

iii) sum up all the Weighted Group Scores as Shape Match Score as described in step 1240 in FIG. 12. Thus the Shape Match Score for "Feature movie" is 20%+44%+28%=92%. Since there is only one round in this layer, turn now to the inner round "Outdoor Ent.". Similarly the Group Score for "Type" and the Shape Match Score for "Outdoor Ent." are calculated as 100% since there is only one group in this round. Apply the shape weights of "Outdoor Ent." (110) and "Feature movie" (120) on the calculated Weighted Group Scores 100% and 92%, and obtain the Weighted Shape Match Score for "Outdoor Ent." as 96%.

iv) repeat step iii) to obtain the Shape Match Score for the next inner layer, which is the round "Ent.", as described in step 1250 in FIG. 12. Similarly the Shape Match Score for "Ent." Is 93%, summed up by Weighted Group Scores for group "Type" and "Companion". The Weighted Shape Match Score for "Ent." is calculated as 95%, which represents similarity indication between the entity of interest and the candidate entity. It is to be noted that the present disclosure is not bound by this particular manner of calculating similarity indication.

Each of the candidate entities in the data repository will go through the same comparison process as above, and only if the similarity indication meets a certain criterion, the candidate entity will be shown as a resulting entity to the user.

It is to be noted that there are two search scenarios which may yield different search and comparison results. The first one is as illustrated above, wherein a user specifies his entity of interest by drilling down from the main round "Ent." to "Outdoor Ent." then further to "Feature movie". In this case, the search results are accordingly based on the whole entity of interest which is comprised of three layers of rounds. The comparison result for the candidate entity is shown as above 95%. In the second scenario, the search is initiated by the user entering a keyword, such as "movie". The keyword will be searched in the data repository and will be redirected to the round "Feature movie". Since "Feature movie" is a sub-attribute of both "Outdoor Ent." and "Indoor Ent.", the user will be asked to disambiguate at this point if he prefers outdoor or indoor entertainment. For example, the user chooses "Outdoor Ent.", so the "Feature movie" attribute of "Outdoor Ent." will display and let the user perform the manipulation of the scales in this round. In this case the search results are based on the round of "Feature movie" only, and the comparison result in this case would be 92% as shown as the Shape Match Score for "Feature movie" in the previous example.

In accordance with certain embodiments, the comparison can be enhanced based on the user profile information, as illustrated in FIG. 9. For example, when a user is searching an entity of interest through the GUI, he may also be requested to fill in a user profile round by manipulating the profile scales of profile attributes thereby defining his/her personality and personal interests. After the comparison between the entity of interest and the candidate entity is done, the user's typology information will be compared to the "Genre" or "Type" attributes in the candidate entity, which might add certain factors or weights to the comparison results. In another example, the user may have the option to also input keywords when he/she tries to define an entity or search for an entity of interest. The keywords can include certain features which may not be represented by the attributes of the entity, for example, in the case that the entity is "feature movie", the user can add keywords such as the characters or actors in the movie. The keywords information will also be stored in the data record in a data repository, for instance in the metadata portion as XML format. In this case, the user profile information or the keywords of the entity of interest may be used to compare with certain keywords of the candidate entity, thereby affecting the comparison results.

The examples and embodiments should not be construed as limiting the present disclosure in any way, but are provided for exemplary purposes only.

By way of example, the presently disclosed subject matter may be used for instance to express emotions, opinions, wishes, provide information and specify needs and queries. It can be used in certain areas such as personal match making, service provider search, career matching, polls or any other suitable applications. For example, a seller on Amazon.com can define his/her products and specify the features of the products in details on a GUI that is constructed and manipulated in accordance with the method described in FIG. 6, and an Internet buyer can search for a product of his/her interest by describing it on the same GUI and searching through the GUI for a matching product in accordance with the methods provided in FIG. 7 and FIG. 12.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter may be a suitably programmed computer. Likewise, the presently disclosed subject matter contemplates a computer program being readable by a computer for executing the method of the presently disclosed subject matter. The presently disclosed subject matter further contemplates a machine-readable memory tangibly embodying a program of instructions executable by the machine for executing the method of the presently disclosed subject matter.

The invention claimed is:

1. A computer-implemented method for comparing similarity between an entity of interest and a candidate entity, said method comprising:
    a) retrieving from a data repository data records representing said entity of interest and said candidate entity, said data records include at least attribute data, scale data and group operation data, wherein the attribute data representing attributes of said entity of interest and said candidate entity, the scale data representing scales associated with respective attributes and signifying levels of significance of said respective attributes, said attributes being classified into groups, said group operation data being indicative of different group operations within said groups, said attributes associated with said scales forming predetermined shapes on a Graphic User Interface (GUI) representing said entity of interest and said candidate entity;
    b) comparing scale data associated with each attribute of said entity of interest with scale data associated with the same attribute of said candidate entity, selecting the smaller scale of the comparison as Attribute Compare Score for each attribute;
    c) calculating a Group Score for each group of said groups, including:
        if the group operation data of a group is set to OR, calculating a ratio of the largest Attribute Compare Score within said group to the maximum scale of attributes of the group, setting the ratio as the Group Score;
        otherwise the group operation data of the group is set to AND, calculating a ratio of a sum of Attribute Compare Scores of the group to a sum of the scale data associated with the attributes of said entity of interest, setting the ratio as the Group Score; and
    d) summing up Group Scores of said groups as a Shape Match Score, representing a similarity indication between said entity of interest and said candidate entity.

2. A computer-implemented method for comparing similarity between an entity of interest and a candidate entity, said method comprising:
    a) retrieving from a data repository data records representing said entity of interest and said candidate entity, said data records include at least attribute data, scale data and group operation data, wherein the attribute data representing attributes of said entity of interest and said candidate entity, the scale data representing scales associated with respective attributes and signifying levels of significance of said respective attributes, said attributes being classified into groups, said group operation data being indicative of different group operations within said groups, said attributes associated with said scales forming predetermined shapes on a Graphic User Interface (GUI) representing said entity of interest and said candidate entity; said attributes being hierarchical and associated with respective shapes of their own characterized by sub-attributes of said attributes and scales of said sub-attributes, thereby forming layers of said shapes to represent said entity of interest and said candidate entity, assigning weights respectively to said sub-attributes, said attributes, said groups and said shapes;
    b) from the most outer layer of said shapes, for each sub-attribute, calculating a ratio of a sub-attribute weight to a sum of all sub-attribute weights within a respective group, applying the ratio of each sub-attribute weight to the scale data of the sub-attribute, giving rise to a weighted scale data, comparing the weighted scale data of the sub-attribute of said entity of interest to the weighted scale data of the same sub-attribute of said candidate entity, and selecting the smaller scale of the comparison as Attribute Compare Score for each sub-attribute;
    c) for each group of said groups,
        i) calculating a Group Score, including:
        if the group operation of a group that is set to OR, calculating a ratio of the largest Attribute Compare Score within said group to the maximum scale of sub-attributes of said group, setting the ratio as the Group Score;
            otherwise the group operation of the group is set to AND, calculating a ratio of a sum of Attribute Compare Scores of the group to a sum of the scale data of the sub-attributes of said entity of interest, setting the ratio as the Group Score, calculating all Group Scores; and
        ii) calculating a ratio of a group weight of said group to the sum of all group weights, applying the ratio of each group weight to the respective Group Score, giving rise to a Weighted Group Score;
    d) summing up Weighted Group Scores of said groups in a shape as a Shape Match Score, calculating all Shape Match Scores for shapes in the most outer layer that are drilled down from the same inner shape, calculating Shape Match Score for said inner shape, calculating a ratio of a shape weight to a sum of all shape weights in said most outer layer together with the inner shape weight, applying the ratio of each shape weight to the respective Shape Match Score, giving rise to a Weighted Shape Match Score for the inner shape, calculating Weighted Shape Match Scores for all the inner shapes; and e) repeating d) until a Weighted Shape Match Score in the most inner shape is obtained, which represents a similarity indication between said entity of interest and said candidate entity.

* * * * *